(12) United States Patent
Merfels

(10) Patent No.: US 10,962,369 B2
(45) Date of Patent: Mar. 30, 2021

(54) FUSION OF POSITION DATA BY MEANS OF POSE GRAPH

(71) Applicant: Volkswagen Aktiengesellschaft, Wolfsburg (DE)

(72) Inventor: Christian Merfels, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 354 days.

(21) Appl. No.: 15/767,022

(22) PCT Filed: Sep. 14, 2016

(86) PCT No.: PCT/EP2016/071632
§ 371 (c)(1),
(2) Date: Apr. 9, 2018

(87) PCT Pub. No.: WO2017/060050
PCT Pub. Date: Apr. 13, 2017

(65) Prior Publication Data
US 2018/0306584 A1 Oct. 25, 2018

(30) Foreign Application Priority Data

Oct. 9, 2015 (DE) .................... 10 2015 219 577.5
Jun. 30, 2016 (DE) .................... 10 2016 211 805.6

(51) Int. Cl.
*G01C 21/16* (2006.01)
*G01C 22/02* (2006.01)
*G01S 19/45* (2010.01)
*G05D 1/02* (2020.01)
*G06K 9/62* (2006.01)

(52) U.S. Cl.
CPC ......... *G01C 21/165* (2013.01); *G01C 22/025* (2013.01); *G01S 19/45* (2013.01);
(Continued)

(58) Field of Classification Search
CPC .. G01C 21/165; G01C 22/025; G06K 9/6288; G01S 19/45; G05D 1/0212; G05D 2201/0213
See application file for complete search history.

(56) References Cited

U.S. PATENT DOCUMENTS

| 2014/0078258 A1 | 3/2014 | Chandraker et al. ........... 348/46 |
| 2016/0071278 A1* | 3/2016 | Leonard .................. G06T 7/579 |
| | | 348/47 |

(Continued)

FOREIGN PATENT DOCUMENTS

| DE | 102016211805 A1 | 4/1917 | ............. G01C 21/28 |
| DE | 102013208521 A1 | 11/2014 | ............. B60W 30/00 |

(Continued)

OTHER PUBLICATIONS

Rehder, Joern et al., "Global Pose Estimation with Limited GPS and Long Range Visual Odometry," IEEE International Conference on Robotics and Automation, pp. 627-633, May 14, 2012.

(Continued)

*Primary Examiner* — Ramsey Refai
(74) *Attorney, Agent, or Firm* — Slayden Grubert Beard PLLC

(57) ABSTRACT

Absolute position data (605) of a machine are determined for respective multiple times (t.1, t.3, t.5, t.8, t.11), and odometry position data of the machine are also determined. A pose graph (661) is generated, wherein edges (672) of the pose graph (661) correspond to the odometry position data, and nodes (671) of the pose graph (661) correspond to the absolute position data (605). The pose graph (661) is optimized to obtain an estimated position. Optionally, the odometry can also be estimated. A driver assistance functionality of the machine, for example a motor vehicle, can be controlled optionally on the basis of the estimated position. For (Continued)

example, the driver assistance functionality can relate to autonomous driving.

19 Claims, 11 Drawing Sheets

(52) U.S. Cl.
CPC ......... *G05D 1/0212* (2013.01); *G06K 9/6288* (2013.01); *G05D 2201/0213* (2013.01)

(56) References Cited

U.S. PATENT DOCUMENTS

| | | | |
|---|---|---|---|
| 2016/0209236 A1 | 7/2016 | Steinhardt | 702/89 |
| 2017/0004379 A1* | 1/2017 | Ramalingam | G06T 7/20 |

FOREIGN PATENT DOCUMENTS

| | | | |
|---|---|---|---|
| DE | 102013218043 A1 | 3/2015 | G01D 1/00 |
| DE | 102014211166 A1 | 5/2015 | B60R 16/023 |
| DE | 102014211178 A1 | 6/2015 | G01C 21/04 |
| GB | 2500384 A | 9/2013 | G01C 11/08 |
| WO | 2017/060050 A1 | 4/1917 | G01C 21/16 |
| WO | 2015/105597 A2 | 7/2015 | G01C 23/00 |

OTHER PUBLICATIONS

International Search Report and Written Opinion, Application No. PCT/EP2016/071632, 8 pages, dated Dec. 15, 2016.

* cited by examiner

FUSION OF POSITION DATA BY MEANS OF POSE GRAPH

CROSS-REFERENCE TO RELATED APPLICATIONS

This application is a U.S. National Stage Application of International Application No. PCT/EP2016/071632 filed Sep. 14, 2016, which designates the United States of America, and claims priority to DE Application No. 10 2015 219 577.5 filed Oct. 9, 2015 and DE Application No. 10 2016 211 805.6 filed Jun. 30, 2016, the contents of which are hereby incorporated by reference in their entirety.

TECHNICAL FIELD

The invention relates to a method and a control unit. In particular, various embodiments relate to techniques for considering odometry position data and absolute position data of a machine when obtaining an estimated position of the machine. In the process, a pose graph may be used. In particular, various embodiments relate to a pose graph with chain geometry.

BACKGROUND

Techniques are known for creating maps of regions. For example, a method is known from DE 10 2013 208 521 A1 for collectively learning and creating a digital road model. In the process, trajectory data and perception data are detected for a plurality of trajectories of one or more vehicles. An information graph is formed, wherein trajectory points from the plurality of trajectories form nodes of the information graph and, based on odometry measurements and position measurements, edges are formed between, or respectively on the nodes of the information graph. The information graph is optimized. Such a technique has the disadvantage that model forming is complex and requires a great deal of time. Real-time use, such as for controlling a driver assistance functionality, is typically impossible.

On the other hand, techniques are also known for determining an estimated position of a motor vehicle in conjunction with a driver assistance functionality (positioning). In particular, positioning techniques are known that consider absolute position data and odometer position data when determining the estimated position of the motor vehicle. In order to ensure the driver assistance functionality, this is carried out in real time.

In the process, the absolute position data indicate the measured position of the motor vehicle at a specific time in absolute values, such as in a UTM or WGS84 reference coordinate system. Optionally, the absolute position data can also be provided with an orientation that, for example, indicates a current direction of movement of the motor vehicle. A combination of the position and orientation is frequently described as a pose.

The odometry position data, in contrast, indicate an intrinsic movement, or respectively relative movement of the motor vehicle, for example in an arbitrarily established reference coordinate system, or in the so-called vehicle coordinate system (body frame). In the process, the intrinsic movement is, for example, indicated relatively with respect to a previous position of the motor vehicle. For example, a visual odometry method by means of visual 3D points in the surroundings is known from US 2014/0078258 A1. Other odometry positioning systems are also known, for example based on acceleration sensors, etc.

In order to consider a wide variety of position data when determining the estimated position of the motor vehicle, positioning techniques are known that combine one or more odometry position data and one or more absolute position data with each other (sensor fusion). The variety of position data can be output by different positioning systems. The positioning systems can employ different positioning techniques so that the position data from the different positioning systems can show estimations of the position that are independent of each other.

From DE 10 2013 218 043 A1, a method is known for providing relative measured data for a fusion sensor. The fusion sensor is configured to generate an output value for a physical quantity by filtering absolute measured data that correspond to the relative measured data. A Kalman filter can be used to consider the noise.

From DE 10 2014 211 178 A1, a method is known for correcting measured data from a first sensor system. The first sensor system and/or a second sensor system each detect different measured data that in each case directly and/or indirectly describe navigation data. Error values are corrected when they are able to be observed and are assumed to be constant when they are not able to be observed. The error values can be determined by means of an error state space Kalman filter.

A method and a corresponding fusion filter are known from DE 10 2014 211 166 A1 for fusing sensor signals with different chronological signal output delays. The sensor signals each comprise a timestamp that describes the time at which the measured values were detected. Error values and/or the measured values are constantly corrected. Error values can be determined by means of an error state space Kalman filter. By considering a plurality of position data that are independent of each other and are obtained as output from various positioning systems, a more precise and more fail-safe estimation of the motor vehicle position can be provided. In particular for applications in the field of autonomous driving, it is necessary for a highly precise estimation of the motor vehicle position with high reliability to be providable.

In this regard, known positioning techniques by means of sensor fusion, in particular based on the above-described techniques using a Kalman filter, have certain restrictions and disadvantages.

Scenarios can arise, for example, in which the corresponding positioning systems that provide the position data as output do not function with equal reliability in all driving situations of the motor vehicle. For example, positioning systems are known that only function well in relatively undeveloped terrain (such as satellite-based techniques like GPS, for example). Other positioning systems are, for example, restricted to locally-limited, pre-measured environments (such as local positioning systems for a parking garage, etc.).

Conventional positioning techniques by means of sensor fusion, for example based on a Kalman filter, can have the disadvantage that when the output of individual positioning systems are interrupted, or respectively when transitioning between available position data of different positioning systems, no estimation, or no particularly precise estimation, can be provided for the motor vehicle position. For example, with Kalman-filter-based techniques, it can be possible that only a fixed number of predefined positioning systems can be considered; known implementations are established for the presence of odometry position data from a predefined source in combination with absolute position data from another predefined source.

Moreover, conventional positioning techniques by means of sensor fusion can have the disadvantage that different positioning systems can only be considered with slight flexibility. In particular, it can be impossible or only limitedly possible to expand existing algorithms with, for example, additional, new positioning systems, or to consider a variable combination of position data from a wide range of positioning systems when determining the estimated position of the motor vehicle.

SUMMARY

An object exists for improved positioning techniques. In particular, there is a need for positioning techniques that enable a flexible sensor fusion of position data from a wide range of positioning systems.

This object is solved by the features of the independent claims. The dependent claims describe embodiments.

According to one aspect, a method is provided that comprises the following for each of a plurality of points in time: ascertaining odometry position data of a mobile machine based on at least one output from at least one odometry positioning system. For each of the plurality of points in time, the method moreover comprises: ascertaining absolute positioning data of the machine based on at least one output from at least one absolute positioning system. The method moreover comprises the generation of a pose graph with edges and nodes. The edges correspond to the odometry position data, and the nodes correspond to the absolute position data. The method moreover comprises the optimization of the pose graph to obtain an estimated position of the machine.

BRIEF DESCRIPTION OF THE DRAWINGS

In the following, the present invention will be explained in greater detail on the basis of various embodiments. In the figures, the same reference signs designate the same or similar elements.

DETAILED DESCRIPTION OF EMBODIMENTS

Figure 1:
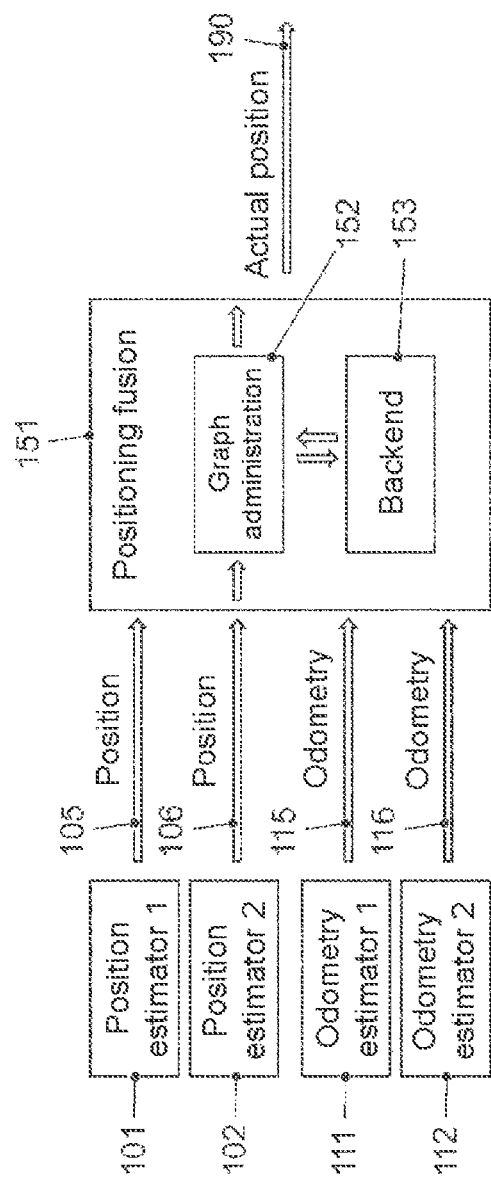
FIG. 1 is a schematic illustration of the logical flow of information in the context of fusing position data from a plurality of positioning systems based on a pose graph according to various embodiments.

In one example, the pose graph may have a node for each of the plurality of points in time. The plurality of points in time may therefore cover a time window of the ACTUAL time extending into the past (sliding window). Correspondingly, when the pose graph is being generated, output from the at least one odometry positioning system and the at least one absolute positioning system can be considered that indicate a current state of the machine, as well as states in the recent past. For example, when the pose graph is being generated, an in one embodiment, a predefined number of points in time can be considered. The use of the pose graph can represent an alternative to the use of the known Kalman filters for sensor fusion.

Basics on the pose graph and a corresponding optimization are, for example, known from Kümmerle, R. et al., g2o: A General Framework for Graph Optimization, in Proceedings of the IEEE International Conference on Robotics and Automation (ICRA), 2011. The design of a corresponding system matrix is also described therein. The pose graph comprises nodes that correspond to optimizing state variables (in this context, absolute positions of the machine at a specific point in time), and edges that correspond to a pair-wise linkage of the states of the nodes connected by the respective edge. It is, for example, possible for the nodes of the pose graph to be associated with a direction (heading); the nodes can thus represent poses. The pose graph according to the various scenarios disclosed herein comprises the output of the at least one odometry positioning system and the at least one absolute positioning system.

For example, in some embodiments, the estimations for the position of the machine as provided by the at least one absolute positioning system can be considered in conjunction with nodes of the pose graph. For example, the different nodes of the pose graph can be linked by boundary conditions to the various absolute position data of the at least one absolute positioning system—sometimes such links in the form of boundary conditions are also described as edges of the pose graph; this terminology, however, will not be adopted herein to avoid ambiguities. For example, the absolute position data can be formally considered as fixed nodes that are not influenced by the optimization, and the nodes of the pose graph to be optimized can be described as optimization nodes. An optimization node can be linked by boundary conditions to a plurality of fixed nodes, the position of which is not changed by the optimization.

In one embodiment, the pose graph can have a chain geometry. The chain geometry can correspond to a serial sequence of nodes of the pose graph. This can mean that no nodes of the pose graph have more than two directly adjacent nodes.

By means of the chain geometry, a particularly efficient optimization of the pose graph can be enabled. In particular, the optimization of the pose graph can be implemented in a manner that is particularly efficient in terms of computation. This allows, for example, real-time applications to be supported.

For a chain geometry, it is also possible in an embodiment for directly adjacent nodes to be connected to each other by more than one edge. This can, for example, be the case in particular when a plurality of different outputs is available for odometry position data. It would, for example, be possible for no nodes of the pose graph to be connected to the respective directly adjacent nodes by more than 2·N edges. N can be the number of outputs of the at least one odometry positioning system. It is, for example, possible for each odometry positioning system to provide only one individual output: In such a case, N can correspond to the number of odometry positioning systems.

Such a technique makes it possible on the one hand to implement a chain geometry of the pose graph (and thereby allow the pose graph to be optimized in a very computationally efficient manner); on the other hand, all the output from the at least one odometry positioning system can thus be considered (and the position of the machine can thereby be estimated particularly precisely). Flexible sensor fusion is possible.

If two directly adjacent nodes of the pose graph are connected to each other by more than one edge, this can correspond to parallel edges of the pose graph between the two nodes. In this context, it would, for example, be possible for the two edges to be associated with different variances, or respectively imprecisions, in corresponding embodiments. Such a scenario can, for example, occur when the two parallel edges are associated with different odometry positioning systems. The different odometry positioning systems can, for example, provide raw odometry position data with a different precision. Given such deviating characteristic properties of the parallel edges, it may be possible that the presence of more than one edge between two directly adjacent nodes of the pose graph can have a characteristic influence on the optimization result.

For example, the estimations of intrinsic movement, as it is provided as the output of the at least one odometry positioning system in the form of odometry position data, can be considered in conjunction with the edges of the pose graph in an embodiment. In addition, optimization edges and fixed edges can be considered that are linked in the form of boundary conditions in another embodiment. The optimization edges can in one embodiment be defined by two adjacent optimization nodes. For example, embodiments are conceivable in which more than one odometry positioning system provides output; in such a scenario, it is possible for more than one edge to be present between two adjacent nodes of the pose graph.

In conjunction with the pose graph that has the chain geometry, it can also be possible in an embodiment that no edge connects more than two nodes to each other. For example, scenarios can be avoided in which a continuous edge is connected to three or more nodes, i.e., affects more than two nodes as a boundary condition. This can enable a particularly simple structure of the pose graph. This allows the optimization to be implemented in a particularly computationally efficient manner.

In conjunction with the pose graph that has the chain geometry, it can also be possible in an embodiment for the pose graph to not have any branches. A branch can, for example, correspond to a situation in which more than three branches of the pose graph that each has one or more edges and one or more nodes meet at a node. A particularly simple structure of the pose graph can be enabled by avoiding pose graph branches in another embodiment. This can reduce the optimization time required to perform the optimization.

By implementing the pose graph with a chain geometry, a particularly simple structure of the underlying system matrix that depicts the pose graph can be achieved. For example, in a 2D scenario it would be possible for the system matrix describing the pose graph to have a block tridiagonal shape in one exemplary embodiment.

With such a shape of the system matrix, various effects can be achieved.

First, a particularly computationally efficient inversion of the system matrix can be carried out. Typically, an inversion of the system matrix may be needed in conjunction with the optimization of the pose graph. For example, techniques for the inversion can be used that are specially designed for block tridiagonal matrices. One example is the so-called Cholesky decomposition. This technique has a complexity on the scale of O(n), wherein n is the number of optimization nodes of the pose graph. In contrast to a pose graph that does not have a chain geometry, a very computationally efficient inversion can thereby be performed. For example, a system matrix that describes the pose graph without a chain geometry can be arbitrarily filled. Such an arbitrarily filled system matrix can generally only be decomposed in the Cholesky factoring with a computational complexity on the scale of approximately $O(n^{2,4})$. This can reduce the optimization time.

Second, the optimization of the pose graph in conjunction with the block tridiagonal shape of the system matrix typically requires comparatively little memory. This is the case since so-called "fill-in" does not occur. "Fill-in" means that the optimization algorithm must save additional elements while the optimization is being performed that go beyond the elements of the initial problem. Such a "fill-in" generally occurs for an arbitrarily arranged structure of the system matrix—as can arise for the pose graph without a chain geometry—and additional memory is therefore required.

Third, performing the optimization can also become slower due to the additionally required memory. This is the case because memory access operations are typically associated with a certain latency. Since, as described above, so-called "fill-in" elements must be additionally saved for a pose graph without a chain geometry, additional memory access operations are needed; this causes a slowdown of the optimization. By means of the techniques described herein, the optimization time can therefore be shortened.

Fourth, performing the optimization can be accelerated by avoiding assistance functionalities performed in conjunction with the optimization. For example, re-sorting state variables (variable reordering technique) for matrices that do not have a block tridiagonal shape can be avoided to minimize "fill-in." Typically, such a re-sorting is performed at the beginning of the optimization. A certain amount of time is required to perform the re-sorting which slows down the performance of the optimization as an additional latency. For block tridiagonal matrices, it is unnecessary to perform this re-sorting since generally no "fill-in" occurs. The optimization time can also thereby be implemented to occur very quickly.

Fifth, a marginalization of old nodes and edges of the pose graph can be performed particularly efficiently. For example, the marginalization can comprise: selecting a node of the pose graph after the optimization; and for the selected node: determining a fixed node of the pose graph. The selected node can then be removed from the pose graph. Such marginalization techniques prevent the pose graph from growing unrestrictedly over a longer runtime. With typical marginalization techniques, the information on the nodes to be removed causes a link between all of the other nodes that are directly adjacent to the node to be removed. In one scenario in which the oldest node is always removed, a split-up of the pose graph can be avoided for a pose graph with a chain geometry. Negative effects on the complexity of the optimization can therefore be avoided. This is in contrast to a pose graph that does not have a chain geometry. In such a case, the marginalization of a node such as the oldest node can lead to the pose graph further splitting up, or respectively branching. Over time when the edges are arbitrarily arranged, this results in the pose graph being filled with increasing density. This means that the structure of the system matrix is no longer sparsely filled. This in turn means that optimization increasingly becomes slower and requires more memory. With the techniques described herein, one can prevent the optimization problem from becoming more complex given an increasing number of iterations, or respectively duration of use. This can also limit the optimization time.

In summary, an exemplary system matrix with a block tridiagonal shape can have various beneficial effects. This also means that the pose graph with a chain geometry has correspondingly positive effects. In particular, the optimization can be performed more efficiently: this means that that optimization can be performed faster and less memory-intensively, and with the optimization time not being dependent, or scarcely being dependent, on the number of iterations, or respectively the duration of use. A short optimization time is achieved.

Since the different odometry position data and absolute position data can have deviations from each other, by optimizing the pose graph it can be possible to obtain the estimated position as the best compromise between the different absolute position data and odometry position data. In the context of optimizing the pose graph, the nodes and edges can be shifted, i.e., changed relative to the values obtained from the output of the positioning system. The nodes to be optimized are frequently described as optimization nodes. The optimization nodes are linked by boundary conditions to the nodes and edges obtained from the output of the positioning systems.

It is possible for the absolute position data and/or the odometry position data to be subject to a certain amount of uncertainty.

Such an uncertainty can also be described as a variance. For example, the variance of the odometry position data and/or the absolute position data can be considered when optimizing the pose graph.

In conjunction with the pose graph, frequently error terms are defined that become larger (or smaller) the greater the distance (closeness) of the positions estimated by the optimization to the output of the positioning systems, and the smaller (larger) the variance of the corresponding output of the positioning systems. The optimization may in an embodiment provide a configuration of the pose graph that corresponds to an extremal value of the error terms. In another embodiment, a global extremal value of the error terms is sought. The optimization can be carried out numerically. The optimization can also be carried out iteratively, i.e., comprise a plurality of optimization iterations. For example, the optimization can comprise a technique of nonlinear least squares. For example, the optimization can be carried out using a Gauss-Newton technique and/or a Levenberg-Marquardt technique.

Such techniques enable real-time use. For example, the machine can be a motor vehicle. In one embodiment, the controlling comprises a driver assistance functionality based on the estimated position of the motor vehicle. For example, the driver assistance functionality may relate to autonomous driving of the motor vehicle. It would also be possible for the driver assistance functionality to relate to partially automated or highly automated driving. It would also be possible for the driver assistance functionality to relate to a congestion assistant. It is, for example, possible in an embodiment for the driver assistance functionality to influence the position of the motor vehicle. Accordingly, the position of the motor vehicle can be influenced based on the estimated position. For example, the driver assistance functionality can control an electrical steering train of the motor vehicle. For example, the driver assistance functionality can control the braking and the engine of the motor vehicle. For example, the driver assistance functionality can comprise a lane departure warning system, a distance assistant, a parking assistant, etc. in corresponding embodiments.

By using the pose graph, it is in an embodiment possible to consider a different number of odometry position data and/or a different number of absolute position data. It is in particular possible for the number of odometry position data and/or the number of absolute position data that are considered when generating the pose graph to vary as a function of time. By the generic use of the odometry position data and the absolute position data, the output of the various positioning systems to be fused can be exchanged in a modular manner. This can make it possible to always consider all the available output from positioning systems. This can in an embodiment make it possible to also obtain the estimated position of the machine with particularly high reliability, even in transitional situations in which output from certain positioning systems are no longer or are only limitedly available but output from other positioning systems is available.

In addition, the use of the pose graph permits a more precise estimation of the position of the machine in comparison to reference implementations based on Kalman filters, not only for the ACTUAL time, but also for the past.

In various scenarios, the optimization of the pose graph can also provide reliability for the estimated position of the machine. It is possible for the driver assistance functionality of the machine to still be controlled based on the reliability of the estimated position.

The reliability can, for example, consider the sum of the error terms for the different nodes of the optimized pose graph. More current (older) nodes can have a greater (lesser) influence on the reliability of the estimated position. For example, in a scenario in which the reliability of the estimated position obtained by optimization is comparatively large, a manual driver intervention can be requested by the driver assistance functionality.

By considering the reliability of the estimated position, the driver assistance functionality can be controlled with great certainty; in particular, one can avoid controlling the driver assistance functionality based on estimations for the position of the motor vehicle that are not, or are only limitedly credible.

In various scenarios, the optimization of the pose graph can also provide an estimated odometry of the machine. It is possible for the driver assistance functionality of the motor vehicle to still be controlled based on the estimated odometry.

The odometry can, for example, and in an embodiment indicate a current orientation/driving direction of the machine. Together with the estimated position of the motor vehicle, an estimated position and orientation (pose) of the motor vehicle can thus be provided.

For example, the estimated position of the machine at a future point in time relative to the plurality of points in time can be obtained by optimizing the pose graph in one embodiment.

In other words, it can be possible in various embodiments to estimate the position for a future point in time. A prediction for the position of the machine can therefore be made.

The generation and optimization of the pose graph requires a certain amount of time (optimization time). The optimization time can be compensated by providing the estimated position for the future point in time.

This can make it possible to control the driver assistance functionality in a particularly targeted manner. In particular, it can be possible to provide information on the current position of the machine with a particularly low latency time. Real-time applications are possible.

The optimization time can be reduced by limiting the number of nodes in the pose graph. A marginalization technique can be employed for this. For example, the marginalization can comprise: selecting a node of the pose graph after the optimization; and, for the selected nodes: determining a fixed node of the pose graph. The selected node can then be removed from the pose graph. By removing the selected node from the pose graph, the number of nodes in the pose graph can be reduced. Since, however, the fixed nodes for the pose graph are simultaneously determined, a subsequent optimization of the pose graph can nonetheless have high precision.

For example, after removing the selected node, the method could still comprise: new optimization of the pose graph to obtain another estimated position of the machine. The position of the fixed node can remain unchanged relative to the new optimization. The fixed node can be connected by an edge to an adjacent node of the pose graph. Since the position of the fixed node is unchanged, or respectively fixed relative to the new optimization, the complexity of the new optimization can be comparatively limited. This can reduce the optimization time.

Such marginalization techniques are based on the insight that it frequently can be necessary to reduce the number of nodes and edges in the pose graph due to restrictions in the complexity of the optimization of the pose graph. This can be carried out by removing, or respectively deleting individual nodes and edges in the pose graph. For example, the oldest nodes and edges in the pose graph can be deleted, i.e., the nodes in the pose graph can be selected that correspond to the oldest point in time. Such a deletion of old nodes and edges conventionally prevents old position data from influencing the current estimation of the position. Consequently, the estimations have a limited precision. For example, the estimations for the position can have a comparatively high imprecision.

So-called marginalization approaches are therefore known in previously known techniques. Previously known marginalization approaches comprise the formation of the Schur complement on the system matrix. Such techniques do not have an exemplary correspondence in the pose graph. Such techniques frequently result in a more densely filled system matrix; this can in turn increase the computing effort to perform the optimization, whereby the optimization time can in turn be comparatively long.

By providing the fixed node instead of the selected node, such as the node that corresponds to the oldest point in time, the techniques described herein make it possible on the one hand to avoid a denser filling of the system matrix, and accordingly a longer optimization time, and to simultaneously not reduce, or not significantly lower, the precision when estimating the position by optimizing the pose graph. The techniques described herein therefore enable a particularly precise marginalization of the pose graph in comparison to previously known techniques. By means of the techniques described herein, it can accordingly be possible for the optimization problem to remain manageable even after several marginalizations of the pose graph and not to degenerate as a function of time.

Different techniques for determining the fixed node can be employed. For example, the fixed node can be determined based on elements that are selected from the following group: the position of the selected node, at least one edge that is connected to the selected node, absolute position data that correspond to the selected node, and another fixed node that is connected by an edge to the selected node. For example, the absolute position data can be represented by a fixed node. Such fixed nodes that are connected by an edge as a boundary condition to the selected node can be considered when determining the fixed node; other absolute position data can remain unconsidered. For example, the other fixed node may have been determined in the context of a previous marginalization. For example, all other available corresponding other fixed nodes can be considered. This can, for example, make it possible for the fixed node to intrinsically bundle information with respect to the selected and removed node. Previous information is then not simply discarded by removing the selected node; instead, the information is transferred to the fixed node. Therefore, the fixed node could also be described as a prior fixed node.

Since such a fixed node can be directly represented in the graph, a semantic interpretation is readily feasible in contrast to conventional marginalization based on the Schur complement. Such a semantic interpretation could, for example, be: "The bundled position information that was previously removed from the pose graph leads to the estimation that the machine was at the position of the fixed node." It would therefore be possible for the fixed node to represent the Schur complement of the selected node. This can prevent the fixed node from reducing the precision of the optimization by removing the selected node. In other embodiments, other techniques are, however, also possible for determining the fixed node.

The pose graph that has the fixed node but not the selected node can continue to represent the complete, or respectively original optimization problem. However, it is unnecessary to consider the system matrix representation of the pose graph for comprehensive understanding. This improves the potential of the developer/user understanding the problem, analytical options and manipulation options for solving the problem.

As another effect, the fixed node makes it possible to adapt the uncertainty of the old information and influence the weighting if necessary. For example, before performing a new optimization, the method could moreover comprise: adapting a loss function of the edge of the pose graph that runs between the fixed node and the adjacent node, and/or adapting an uncertainty of the fixed node. Particularly implausible information that is depicted in the fixed node can then be considered with greater uncertainty which can increase a tolerance in the optimization. It is also possible to apply a robust cost or loss function to the error term of the boundary condition that is represented by the fixed node.

It would, for example, be possible to selectively perform the removal of the selected node depending on a number of nodes of the pose graph. If, for example, the number of nodes in the pose graph exceeds a given threshold value, the oldest node can always be selected and removed from the pose graph, wherein the corresponding fixed node is simultaneously determined. Consequently, on the one hand, the optimization time does not become excessively long due to a particularly large number of nodes; at the same time, an unnecessarily frequent marginalization of the pose graph can be avoided.

According to various examples, it is possible to determine the plurality of points in time for which the odometry position data and the absolute position data are ascertained based on a given clock rate. It is in an embodiment possible to receive raw odometry position data as the output from the at least one odometry positioning system at the associated sampling rates. Correspondingly, it is in an embodiment possible to receive raw absolute position data as the output from the at least one absolute positioning system at the associated sampling rates. The given clock rate can be different from the sampling rates. The sampling rates can vary as a function of time.

For example, it would be possible for the method to moreover comprise: interpolation of the raw absolute position data based on the given clock rate, and optionally based on the respective sampling rate, to ascertain the absolute position data for each of the plurality of points in time. For example, it would also be possible for the method to moreover comprise: interpolation of the raw odometry position data based on the given clock rate, and optionally based on the sampling rate, to ascertain the odometry position data for the various points in time. The interpolation can therefore in an embodiment be carried out within the position time period. For example, the interpolation can be carried out in a reference coordinate system of the pose graph.

For example, it would be possible in many scenarios for the sampling rate with which the determined raw odometry position data are obtained to be smaller than the clock rate. In such a case, the interpolation of the raw odometry position data in one embodiment comprises a decrease of the time resolution of the odometry position data ascertained thereby relative to the corresponding raw odometry position data. Consequently, it can be achieved that an edge corresponding to the determined raw odometry position data does not skip a node in the pose graph. Branches in the pose graph can thereby be avoided, and the chain geometry of the pose graph with the different aforementioned beneficial effects can be achieved.

For example, it is possible in many scenarios for the sampling rate with which determined raw odometry position data are obtained to be greater than the clock rate. In such a case, the interpolation of the raw odometry position data in an embodiment comprises an increase in the time resolution of the odometry position data ascertained thereby relative to the corresponding raw odometry position data. Consequently, it can be achieved that adjacent nodes in the pose graph are only connected by a single edge corresponding to the determined raw odometry position data. The chain geometry of the pose graph is enabled.

In various embodiments, it is possible to perform a coordinate transformation of the raw absolute position data and/or the raw odometry position data in order to obtain the absolute position data and/or the odometry position data respectively. For example, a coordinate transformation could be performed between a UTM coordinate system and a WGS84 coordinate system. It would also be possible for the coordinate transformation to comprise a coordinate rotation. For example, a rotation could occur between a proprietary reference system, such as the speed and yaw rate of the motor vehicle as the machine, and the reference system of the pose graph. For example, a model of the motor vehicle can in an embodiment be considered in order to consider vehicle-specific properties during the coordinate transformation.

By means of such techniques, it is possible to flexibly consider different time behavior of the various positioning systems. In particular, it is unnecessary for the various positioning systems to provide the output at a defined or static sampling rate. No a priori assumption must be made about the time behavior of the position data considered when generating the pose graph.

For example, it would be possible to provide the raw odometry position data and/or the raw absolute position data each with a timestamp. For example, the timestamp could indicate a point in time at which the respective positioning system measured the odometry position data and/or the raw absolute position data.

For example, it can be possible to not provide position data from different positioning systems in a chronological sequence, but rather in a sequence that is reversed in comparison to the corresponding timestamps. This can be the case since the different positioning systems can have different sampling rates and/or different latency periods. For example, the odometry position data and the absolute position data for the plurality of points in time can be buffered in a memory.

When generating the pose graph, such raw position data received out of chronological sequence can be easily inserted in the past. This increases flexibility when fusing the output from a wide variety of positioning systems. A real-time generation and optimization of the pose graph can be unnecessary since a prediction for the estimated position at the future point in time can be made.

It is, for example, in an embodiment possible to perform an iteration of the generation and optimization of the pose graph for each cycle of a given optimization clock rate. For each iteration, the corresponding estimated position of the machine can be obtained.

It is possible for the chosen optimization clock rate to be different from the clock rate that determines the plurality of points in time. It would, however, also be possible for the chosen optimization clock rate to be the same as the clock rate for determining the plurality of points in time. In both scenarios, it can be possible to iteratively generate the pose graph, i.e., so that previously generated pose graphs can be accessed for various iterations of the generation and optimization of the pose graph.

For example, the optimization clock rate can lie within a range between 0.1 Hz and 100 Hz in one embodiment and in another embodiment within a range between 1 Hz and 50 Hz. In various scenarios, it can be desirable to keep the optimization clock rate as constant as possible. This can make it possible for downstream logic such as in particular the driver assistance functionality to be particularly reliably operable, or respectively controllable.

By using the pose graph, a particularly efficient optimization for obtaining the estimated position of the machine can be implemented. Accordingly, comparatively high optimization clock rates can be selected. This allows the estimated position to be determined particularly rapidly.

It is, for example, possible to monitor the time that is required at least to optimize the pose graph in the various iterations. It is in another embodiment possible to determine the given clock rate and/or the number of points in time and/or a precision of the optimization depending on the monitoring of the time.

For example, the precision of the optimization can correspond to a number of optimization iterations. For example, a greater (lesser) precision can correspond to a greater number (lesser number) of optimization iterations.

Said monitoring can in another embodiment comprise the repeated measurement of the optimization time. For example, the entire time that is required to generate and optimize the pose graph can be monitored. For example, it would be possible to select slower (faster) clock rates and/or a smaller (larger) number of points in time and/or a lesser (greater) optimization precision if the monitoring indicates a longer (shorter) optimization time. Slower (faster) clock rates and a smaller (larger) number of points in time can result in a shorter (longer) time that is required at least for optimizing the pose graph in the various iterations.

Excessively long optimization times can thereby be avoided. In other words, it can be possible to flexibly adapt the optimization time in an embodiment.

For example, the clock rate can lie within a range of 1 Hz-1000 Hz, or within a range of 10 Hz-100 Hz, or within a range of 25-50 Hz.

It is in principle possible for at least some of the sampling rates to have a time dependency. For example, at least some of the sampling rates can have fluctuations over time. In other words, when generating the pose graph, it may be possible to consider positioning system output that does not provide position data at a constant sampling rate. It is, for example, in an embodiment possible for at least one of the sampling rates to lie within a range of 0.1 Hz-100 Hz, or within a range of 0.5 Hz to 10 Hz, or within a range of 0.5 Hz to 2 Hz.

In the different scenarios described herein, it can also be possible for the output from at least one of the positioning systems to provide the associated position data out of chronological sequence (out of order). In scenarios, it can be possible, for example in contrast to reference implementations based on a Kalman filter, to consider such position data obtained out of sequence when generating the pose graph.

In particular, it can, for example, be possible for at least one of the sampling rates to have interruptions. For example, the interruptions can comprise more than two sampling intervals of the corresponding sampling rate. For example, the interruptions can comprise more than 10 sampling intervals. For example, the interruptions can comprise more than 100 sampling intervals.

The interruptions can represent lapses during which no, or no credible, position data from the corresponding positioning system are available.

In other words, it can therefore be possible for lapses in providing output from the various positioning systems to be compensated. The pose graph can be generated with a flexible number of outputs from various positioning systems.

For example, it is possible in corresponding scenarios for the absolute position data to be ascertained based on the output of a first absolute positioning system, in each case for a plurality of points in time in a first time interval; the absolute position data can in an embodiment be ascertained based on the output of a second absolute positioning system, in each case for a plurality of points in time in a second time interval. The first absolute positioning system can be different from the second absolute positioning system. The absolute position data can in an embodiment be ascertained for the plurality of points in time in the first time interval not based on the output from the second absolute positioning system.

Therefore, for example, the first time interval can represent an interruption with regard to the output of the second absolute positioning system. In some scenarios, the method can comprise: switching between the output of the first absolute positioning system and the output of the second absolute positioning system at the end of the first time interval.

In various exemplary scenarios, it can therefore be possible to consider different outputs from positioning systems depending on the point in time. For example, it can be possible in some implementations to flexibly switch between the output from the first and second absolute positioning system when generating the pose graph. The switchover can be carried out gradually. In particular in transitional situations, it can thus be possible to estimate the position of the machine with high reliability.

It is, for example, possible to reject at least parts of the raw absolute position data and parts of the raw odometry position data before generating the pose graph.

In this context, rejecting can, e.g., mean: not considering the rejected raw odometry position data and the rejected raw absolute position data when generating the pose graph. Rejecting can mean: deleting the rejected raw odometry position data and the rejected raw absolute position data from a memory, for example at a later time when, for example, out-of-order raw position data are no longer expected, or when the corresponding raw position data lie outside of a time window considered when generating the pose graph. The rejection can correspond to a removal of the pose graph, i.e., old entries are deleted.

Rejecting can result in the pose graph having a comparatively small size. A comparatively short optimization time can thereby be achieved. The estimated position can thereby be provided with a high optimization clock rate. This allows the driver assistance functionality to be controlled with a comparatively high precision.

In various exemplary scenarios, it is possible to flexibly adapt the rejection of various parts of the position data from optimization iteration to optimization iteration. In so doing, a wide range of decision criteria can be considered in corresponding embodiment.

For example, in some scenarios, the selective rejection can be based on a time difference between the ACTUAL time and a timestamp of the respective raw absolute position data and the raw odometry position data. For example, only such raw absolute position data and raw odometry position data can be considered that are more current than a certain time threshold value. For example, the time difference can lie within a range of 5 seconds to 1 hour, or within a range of 5 seconds to 10 minutes, or within a range of 5 seconds to 20 seconds, or it can be approximately 10 seconds.

By means of such rejecting techniques based on the timestamp and the time difference, it can be achieved that such position data that only have a slight relevance for determining the estimated position of the motor vehicle are rejected. Relevant position data are considered when generating the pose graph. This can accelerate the optimization of the pose graph, wherein, however, the reliability of the estimated position can be comparatively high.

Correspondingly, it would in an embodiment also be possible to base the selective rejection of the parts of the raw odometry position data on a data density of the raw odometry position data within the time period, and on the clock rate.

In some implementations, it can, for example, be possible for the method to also comprise: estimating a value of the associated sampling rate for at least one positioning system based on a historical output of the corresponding positioning system. In other words, it can be possible to estimate the sampling rate using the position data already buffered in a memory, for example with a timestamp. This can make it possible to flexibly consider output from various positioning systems without it being necessary to know the associated sampling rates a priori. For example, the estimated value of the sampling rate can be considered for the selective rejection of parts of the raw odometry position data.

For example, it can be possible in some implementations to reject such position data that have a substantially lower data density within the time period than the clock rate. This means that such raw position data can be rejected that exist with large interruptions with respect to the clock rate.

In exemplary implementations, it is possible that the deletion of the raw position data from the memory is only carried out after a certain time difference with respect to an associated timestamp of the raw position data. For example, it can in an embodiment be possible for raw position data that have an interruption to not be deleted directly from the memory. In this case, corresponding raw position data cannot be used in the current iteration to generate the pose graph, but nevertheless are buffered for a certain time in a memory. In this manner, for example belatedly received, out-of-order position data can be waited for that fill up, or respectively close the interruption. Then the corresponding raw position data can be considered in a later iteration when generating the pose graph.

This can avoid an influence of imprecise raw position data on the generation and optimization of the pose graph, and on the estimation of the motor vehicle position; at the same time, the optimization of the pose graph can be accelerated.

For example, the selective rejection can in an embodiment be based on the given optimization clock rate. For example, in some scenarios, a greater number (lesser number) of position data can be rejected the faster (slower) the optimization clock rate.

In various scenarios described herein according to embodiments, it can be possible to reject comparatively old position data until a number of position data is considered when generating the pose graph that is less than or equal to a given maximum threshold value number. In this manner, a number of nodes and edges that comprise the pose graph can be limited. It can thereby be achieved that the pose graph only depicts the more recent past of the development of the position of the motor vehicle.

In exemplary implementations, it can be possible for the current pose graph to be expanded only based on newly received, current raw position data in comparison to the pose graph generated in the prior iteration. It can then be possible to only retain the front, i.e., more current section of the pose graph that corresponds to the given number of nodes and edges. Other nodes and edges, or respectively associated raw position data can be rejected.

According to another aspect, the present invention relates to a control unit. The control unit comprises at least one interface and at least one processor. The at least one interface is configured to receive in each case at least one output from at least one odometry positioning system. The at least one interface is also configured to receive in each case at least one output from at least one absolute positioning system. For each of a plurality of points in time, the at least one processor is configured to ascertain odometry position data of a mobile machine based on the output from the at least one odometry positioning system. For each of the plurality of points in time, the at least one processor is moreover configured to ascertain absolute position data of the mobile machine. The at least one processor is moreover configured to generate a pose graph. Edges of the pose graph correspond to the odometry position data. Nodes of the pose graph correspond to the absolute position data. The at least one processor is moreover configured to optimize the pose graph to receive an estimated position of the mobile machine.

The control unit according to the presently discussed aspect is configured to execute the method according to another aspect of the present invention.

For such a control unit according to the presently discussed aspect, effects can be achieved that are comparable to the effects that can be achieved for the method according to another aspect of the present invention.

The above-presented features and features described below can be used not just in corresponding explicitly presented combinations, but also in other combinations or isolated without departing from the scope of protection of the present invention.

In the following, the present invention will be explained in greater detail using embodiments with reference to the drawings. In the figures, the same reference signs designate the same or similar elements. The figures are schematic representations of various embodiments of the invention. Elements shown in the figures are not necessarily shown true-to-scale. Instead, the various elements shown in the figures are reproduced so that their function and general purpose is understandable to a person skilled in the art. Links and couplings shown in the figures between functional units and elements can also be implemented as an indirect link or coupling. A link or coupling can be implemented wired or wirelessly. Functional units can be implemented as hardware, software or a combination of hardware and software.

In the following, techniques for positioning a machine such as a motor vehicle are described that make it possible to fuse odometry position data from at least one odometry positioning system and absolute position data from at least one absolute positioning system. For the sake of simplicity, reference will be made in the following to a motor vehicle, even though corresponding techniques can also be applied to other machines. The techniques described in the following can in particular be applied to 2D or 3D positioning. For example, the techniques can be employed for the 3D positioning of a flying object, such as an autonomous flying object (drone).

In particular, techniques are described in the following that make it possible to determine an estimated position of the motor vehicle that can be used for a driver assistance functionality. For example, the driver assistance functionality can relate to autonomous driving. Other driver assistance functionalities are also conceivable.

Various examples disclosed herein make it possible to perform the fusion of the various position data based on a pose graph. The pose graph can be optimized in order to estimate the position of the motor vehicle.

In so doing, odometry position data of a motor vehicle are ascertained for each of a plurality of points in time based on at least one output from at least one odometry positioning system, and moreover absolute position data of the motor vehicle are ascertained based on at least one output from at least one absolute positioning system. The pose graph is generated, wherein nodes of the pose graph correspond to the absolute position data, and wherein edges of the pose graph correspond to the odometry position data. The pose graph is then optimized.

Techniques are also described herein that make it possible to efficiently marginalize the pose graph without loss of precision. In so doing, a node to be optimized is replaced with a fixed node.

For example, the pose graph has a chain geometry. The chain geometry can enable particularly efficient optimization of the pose graph. The chain geometry can, for example, be characterized in that the pose graph does not have any branches. This can mean that nodes of the pose graph do not have more than two direct neighbors, i.e., for example a first neighboring node that corresponds to the position of the motor vehicle at a prior point in time, and a second neighboring node that corresponds to the position of the motor vehicle at a subsequent point in time. These points in time can correspond to a clock rate with which the pose graph is constructed. In this context, it is possible in principle for directly adjacent nodes to be connected to each other by one or more edges. For example, adjacent nodes can be connected by more than one edge if more than one source is available for odometry position data.

Using the chain geometry for the pose graph accordingly e.g. prevents edges from being inserted between nodes that are not directly adjacent, even when a plurality of odometry position data is available. Skipping nodes in the pose graph can be avoided.

The chain geometry can be achieved by suitably interpolating raw odometry position data. If, for example, certain raw odometry position data correspond to the change in position between two particularly distant points in time, it can be ensured that only directly adjacent nodes are connected by the corresponding edges by increasing the resolution by means of interpolation.

The techniques described herein are based on the insight that optimizing the pose graph can be performed particularly quickly when the pose graph has the chain geometry. It was recognized that the pose graph with chain geometry, for example defined in 2D, corresponds to a block tridiagonal system matrix. This can be handled in a particularly computationally efficient manner during optimization.

FIG. 1 illustrates various aspects with regard to a work process for positioning by means of sensor fusion. Raw absolute position data 105, 106 are received as output from two absolute positioning systems 101, 102. Furthermore, raw odometry position data 115, 116 are received as output from two odometry positioning systems 111, 112. For example, a software module 151 could receive the corresponding position data 105, 106, 115, 116 on a dedicated thread. A memory (not shown in FIG. 1) can buffer the received position data 105, 106, 115, 116 until they are rejected.

It is then possible for the graph administration 152 to initiate a construction process to generate the pose graph in regular, adjustable time intervals, i.e., with an optimization clock rate. In so doing, the pose graph generated in a prior iteration of the optimization clock rate can, for example, be expanded respectively with new nodes and edges.

The pose graph can have nodes in various scenarios that are arranged at fixed intervals in time. It is correspondingly possible for a plurality of points in time for which the nodes are added to the pose graph to be ascertained based on a given clock rate. For each of the plurality of points in time, corresponding odometry position data and absolute position data can then be ascertained based on the raw odometry position data and the raw absolute position data, and can each be associated with edges to be optimized, or respectively nodes of the pose graph, for example in the form of boundary conditions. The pose graph can have a chain geometry.

For example, the optimization clock rate can be the same or different from the clock rate of the nodes of the pose graph.

After the pose graph has been generated, the optimization can be performed. For this, the generated pose graph is transmitted to a backend 153. The backend 153 then executes the optimization. As the result of the optimization, an ACTUAL position of the motor vehicle is obtained.

In the various scenarios disclosed herein, the ACTUAL position can be a prediction for a future point in time in order to compensate for latency times due to the generation of the pose graph by the graph administration 152, and the performance of the optimization by the backend 153. For example, it would be possible for the ACTUAL position to be a prediction of the position of the motor vehicle for the next cycle of the given optimization clock rate.

Figure 2:
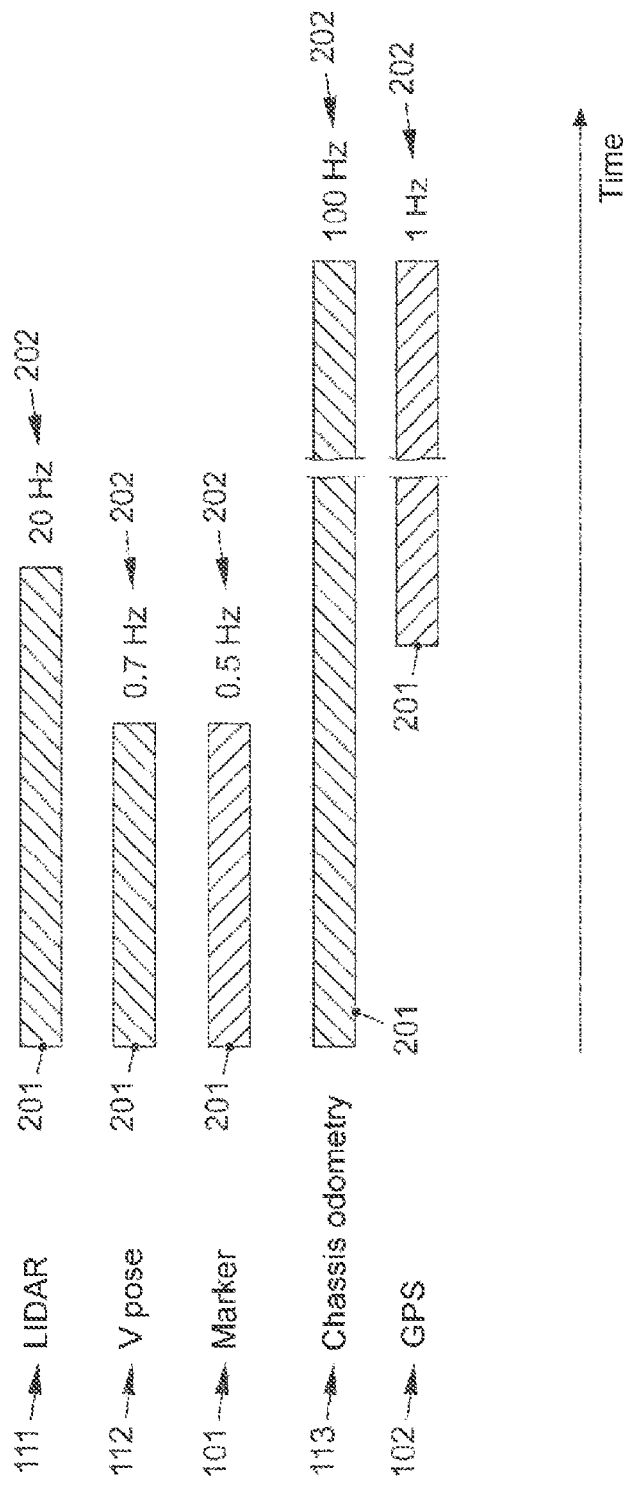
FIG. 2 schematically illustrates the availability of the different position data for points in time at different time intervals in a transitional situation according to various embodiments.

By means of such positioning techniques based on the pose graph, it is possible to flexibly consider position data 105, 106, 115, 116 that originate from different positioning systems 101, 102, 111, 112, 113 (see FIG. 2). The specific type of the employed positioning system 101, 102, 111-113 is not essential to the functioning of the positioning techniques described herein; a wide range of types of positioning systems 101, 102, 111-113 can be used in the various scenarios disclosed herein. Flexible sensor fusion is therefore possible.

For example, satellite-based positioning systems can be used to provide the absolute position data 105, 106; an example is the global positioning system (GPS). For example, recognition of machine-readable characters 101 can be used as the positioning system for providing the absolute position data 105, 106. For example, laser-based distance measurement 111 (light detection and ranging, LIDAR) could be used to determine absolute position data 105, 106 and/or odometry position data 115, 116. Visual pose recognition 112 can also provide the odometry position data 115, 116 based on differences in sequentially-taken pictures that depict a landmark. Information from the chassis odometry 113 can be used to provide the odometry position data 115, 116; for example, in this context, a steering angle and/or a rotational speed of the wheels can be considered. Acceleration sensors could also be used to provide the odometry position data 115, 116; for example, an electronic stability system (ESP) could be used as the acceleration sensor.

Another source for the position data could be car2car systems: these can either determine the position of a vehicle directly, or enable indirect positioning by means of the position of a third vehicle, wherein the relative position to the third vehicle can then be considered.

Stereo and/or mono cameras can be used not just to provide odometry position data, but also alternatively or additionally to provide absolute position data. There are various approaches for this: It is, for example, possible to create a visual map of a route and perform localization in the map while driving through again.

Techniques for simultaneous localization and map creation (simultaneous localization and mapping, SLAM) can also serve as a source of position data. For example, SLAM techniques can provide absolute position data in a global coordinate system, or alternatively or additionally provide odometry position data.

Other examples of positioning systems comprise: techniques based on RFID markers. Techniques based on WLAN networks that are currently being received, and/or based on a triangulation in a known WLAN network map. Cell towers can also be read out.

In the wide variety of scenarios described herein, it can also be possible to generate odometry position data by forming a difference between two time-sequential absolute position data.

From FIG. 2 it can be seen that, on the one hand, the time intervals 201 in which the various positioning systems 101, 102, 111-113 provide the associated position data are different from each other. FIG. 2 shows a so-called transitional situation: The position data 105, 106, 115, 116 that are provided by LIDAR 111, the recognition of machine-readable characters 101, and the visual pose recognition 112 terminate; in exchange, position data from the GPS system 102 become available. A corresponding situation can, for example, result when leaving a parking garage. This means that first the absolute position data 105 are obtained from the recognition of machine-readable characters 101 and not from the GPS system 102; then the absolute position data 106 are obtained from the GPS system 102. In the various scenarios described herein, one can therefore switch between different sources for the position data 105, 106, 115, 116; this means that in the various scenarios described herein, one can switch between the different positioning systems 101, 102, 111-113. The switchover can be carried out gradually. The switchover can be adapted to the situation. The switchover can occur considering transitional phases between the various positioning systems.

FIG. 2 furthermore illustrates that the sampling rates 202 at which the various positioning systems 101, 102, 111-113 provide the associated raw position data deviate from each other.

Figure 3:
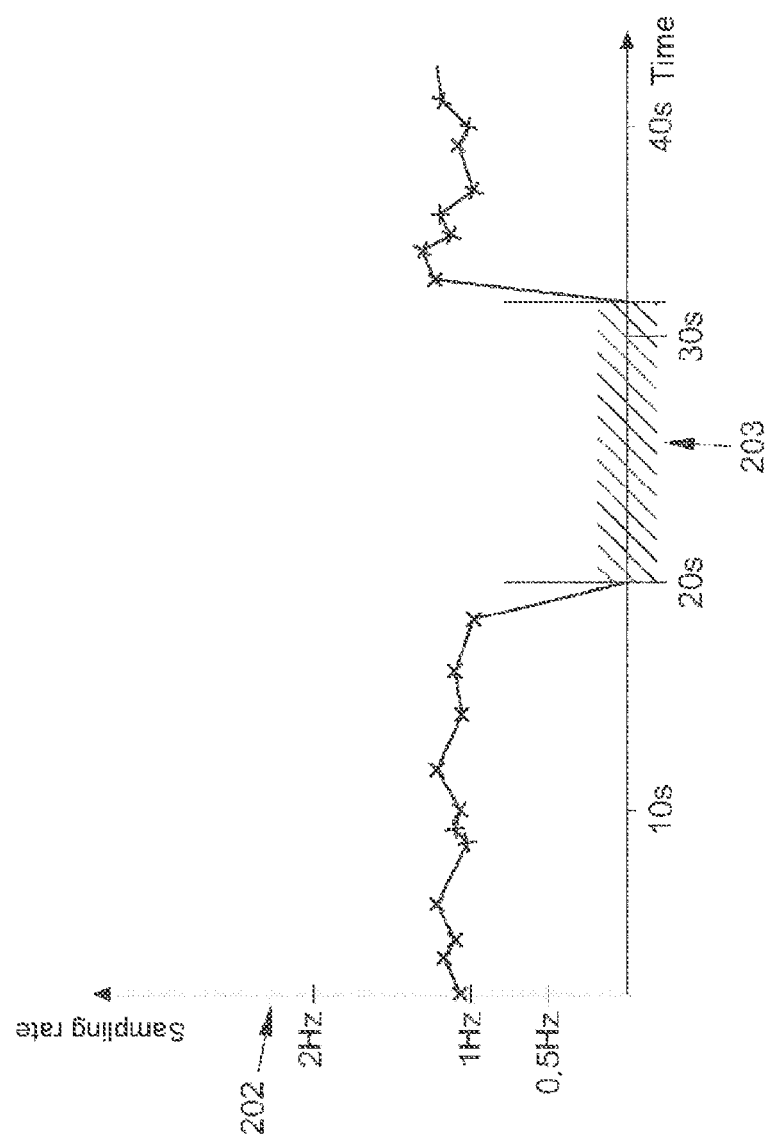
FIG. 3 schematically illustrates the availability of certain position data at various points in time according to various embodiments, wherein in FIG. 3, an interruption is illustrated during which position data are temporarily unavailable.

In various scenarios, it is also possible for the sampling rate 202 to have an interruption 203 (see FIG. 3). In FIG. 3, the sampling rate 202 is plotted as a function of time. In such a scenario, it is possible for the corresponding positioning system 101, 102, 111-113 to not provide any or any significant output during the interruption 203. An interruption 203 can exist in particular when there are significantly fewer raw position data than are demanded by a clock rate at which nodes are inserted in the pose graph. Short interruptions 203 can be compensated, for example by interpolation. However, it is in principle possible for the interruption 203 to be comparatively long. For example, the interruption 203 can comprise a plurality of sampling intervals of the sampling rate 202. In the scenario in FIG. 3, the sampling rate 202 is approximately 1 Hz before and after the interruption 203. This means that a sampling interval has a length of about 1 second. The interruption 203 has a duration of about 12 seconds, hence comprising more than 10 sampling intervals.

It is in principle also possible for the sampling rate 202 to vary as a function of time outside of an interruption 203. For example, depending on the available signal quality, the satellite-based position system 106 could implement a faster or slower sampling rate 202.

In the following, techniques will be described for continuously and reliably determining the ACTUAL position 190 of the motor vehicle with high precision. These techniques can reliably and precisely determine the ACTUAL position 190 in even transitional situations or when sampling rates 201 deviate from each other, or respectively have interruptions 203.

Figure 4:
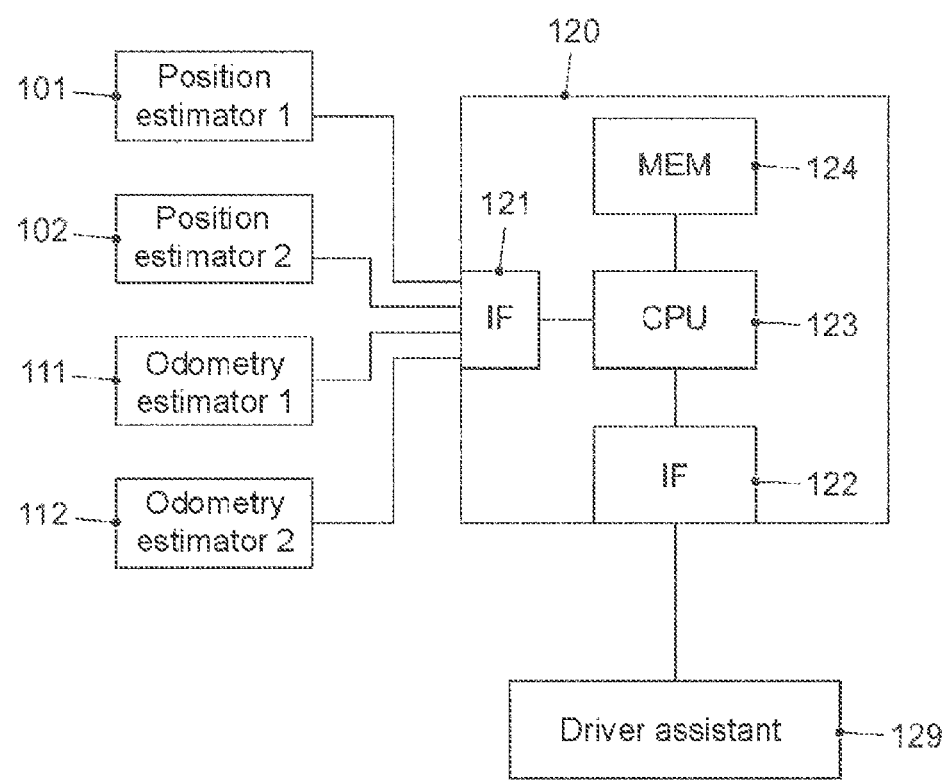
FIG. 4 schematically illustrates a control unit according to various embodiments.

FIG. 4 illustrates a control unit 120 that is configured to perform corresponding techniques. The control unit 120 comprises an interface 121 that communicates with the various positioning systems 101, 102, 111, 112. Furthermore, the control unit 120 comprises a processor 123 that is coupled to the interface 121 and a memory 124. For example, the memory 124 can cache, or respectively buffer the various position data 105, 106, 115, 116. The processor 123 can be configured to perform a wide variety of techniques that are described herein in conjunction with ascertaining the odometry position data and the absolute position data based on the raw odometry position data and the raw absolute position data respectively, generating the pose graph, in particular with chain geometry and the optimization of the pose graph, as well as controlling the driver assistance functionality. To control the driver assistance functionality 129, the control unit 120 comprises another interface 122. The various interfaces 121, 122 can be configured to, for example, communicate via a bus system of the motor vehicle with the various units. Direct data connections are also possible.

Figure 5:
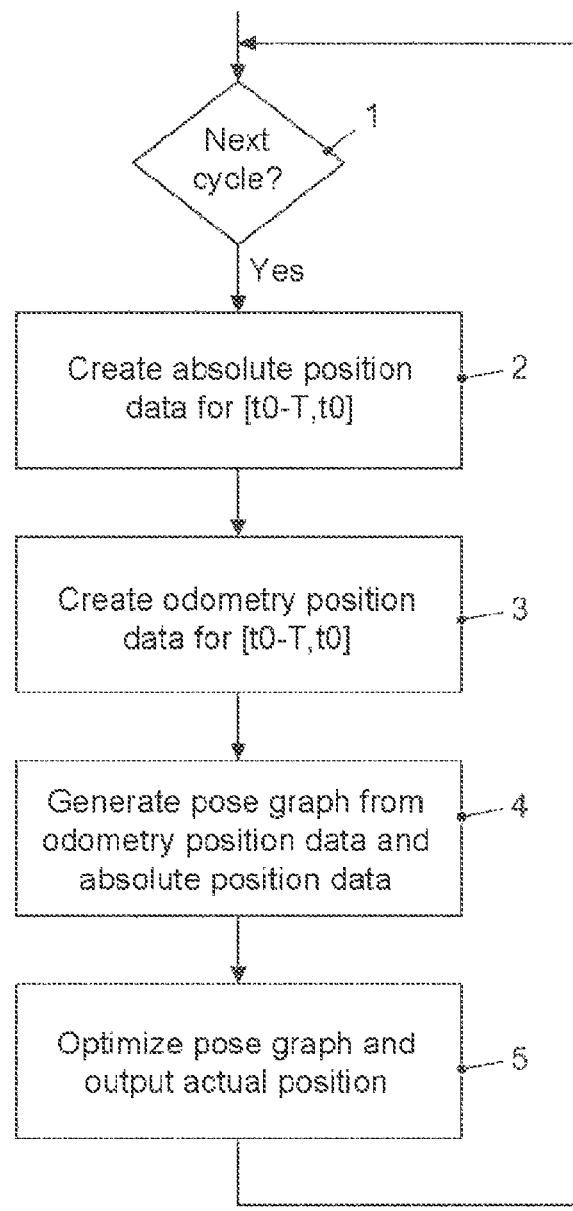
FIG. 5 is a flowchart of a method according to various embodiments.

For example, control data can be saved in the memory 124 that can be executed by the processor 123. When the control data are executed by the processor 123, it can cause the processor 123 to execute a method as illustrated in conjunction with the flow chart in FIG. 5.

First in step 1, it is checked whether the next iteration should be performed to generate and optimize a pose graph; for this, a given optimization clock rate can be considered. For each iteration, an ACTUAL position 190 is obtained.

Optionally, an ACTUAL odometry can also be obtained for each iteration in all of the examples described herein. For example, it can be possible to calculate the ACTUAL odometry based on the two last optimization nodes, i.e., considering the traveled route and the turning carried out. From this, for example, the speed and the rate of turning can be inferred.

Figure 6:
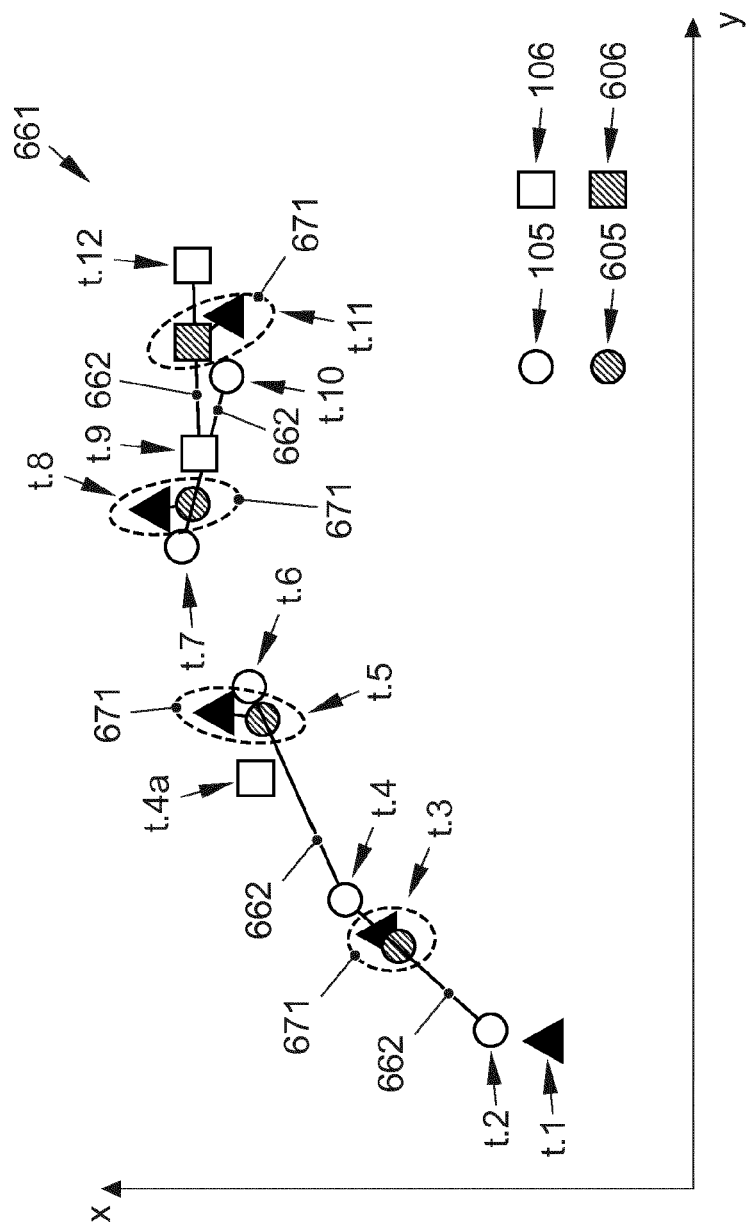
FIG. 6 schematically illustrates the generation of nodes of a pose graph based on raw absolute position data according to various embodiments, wherein the raw absolute position data from two absolute positioning systems are received at different sampling rates.

If the next iteration should be performed, first, absolute position data are ascertained in step 2 based on raw absolute position data 105, 106 for a plurality of points in time. This is illustrated in FIG. 6. FIG. 6 illustrates the pose graph 661 only with reference to nodes 671. The pose graph 661 is shown in two-dimensional xy position space in FIG. 6. In other examples, it would also be possible for the pose graph 661 to be defined in 3D space. The pose graph 661 comprises nodes 671 at the points in time t.1, t.3, t.5, t.8 and t.11. The points in time t.1, t.3, t.5, t.8 and t.11 have a fixed time interval relative to each other and are determined corresponding to a clock rate.

In the various scenarios disclosed herein, a wide range of clock rates can be considered. For example, the clock rate can lie within a range of 1 Hz to 1000 Hz, e.g., within a range of 10 Hz to 100 Hz, e.g., within a range of 25 Hz to 50 Hz. In this manner, the ACTUAL position can be determined quickly and with sufficiently high reliability.

In the various scenarios disclosed herein, it is possible for the clock rate to change and be determined flexibly. For example, a faster clock rate can correspond to a greater number of nodes 671 so that the optimization time also increases; consequently, it can be desirable to determine the clock rate depending on a monitoring of the optimization time. In this manner, a specific optimization clock rate can also be ensured for computationally intensive pose graphs 661.

The nodes 671 correspond to the absolute position data 605, 606 (shown in FIG. 6 with circles and squares filled with hatching). The absolute position data 605, 606 form in particular boundary conditions for the nodes 671. The absolute position data 605, 606 are determined based on the raw absolute position data 105, 106. In so doing, the raw absolute position data 105, 106 are obtained at sampling rates that differ from the clock rate; for example, raw absolute position data 105, 106 are obtained at the points in time t.2, t.4, t.4a, t.6, t.7, t.9, t.10 and t.12. The raw absolute position data 105, 106 have corresponding timestamps.

Consequently, the raw absolute position data 105, 106 are interpolated to obtain the absolute position data 605, 606 (shown in FIG. 6 by the continuous lines 662). For example, the raw absolute position data 105 are interpolated at the points in time t.2 and t.4 to obtain the absolute position data 605 at the point in time t.3. The interpolation is an estimation of where the corresponding positioning system would suspect the motor vehicle to be at the point in time t.3.

All points in time t.1-t.13 lie within the time window [t0-T; t0], wherein t0 represents the ACTUAL time. T describes a time difference. Raw absolute position data 105, 106 that do not lie within this time window are rejected, i.e., not carried over to the pose graph 661, and are, for example, deleted from the memory. The number of nodes 671 in the pose graph 661 can thereby be limited; this reduces the time required for optimization. At the same time, the recent past of the poses of the motor vehicle is considered so that the reliability with which the ACTUAL position 190 can be estimated is comparatively high.

It can occur in many scenarios that, for example, odometry positioning systems which provide output with a comparatively very high sampling rate perform measurements that lie in the future in comparison to the time horizon t0. This can occur due to an internal prediction of the odometry positioning system. It is possible to consider corresponding raw odometry position data when generating the pose graph 661.

Furthermore, the raw absolute position data 105, 106 are selectively rejected based on a data density of the raw absolute position data 105, 106 within the time period and based on the clock rate. For example, only very few raw absolute position data 106 exist within the time range t.1-t.6, in particular in comparison to the clock rate. Consequently, the raw absolute position data 106 would be rejected at the point in time t.4a and not be considered as a boundary condition, for example for the nodes 671 at points in time t.3 or t.5, when generating the pose graph 661.

In other examples, the position data 106 can first remain buffered in a memory at the point in time t.4a, but not be considered in the present iteration for generating the pose graph 661. Deletion from the memory can occur in a later iteration to the extent that out-of-order position data 106 are no longer obtained.

In various other scenarios, it would, for example, be possible for the selective rejection of the various raw absolute position data 105, 106 to be based on the given optimization clock rate; for example, the data could be rejected for a faster (slower) optimization clock rate and a greater (lesser) number of raw absolute position data 105, 106.

Figure 7:
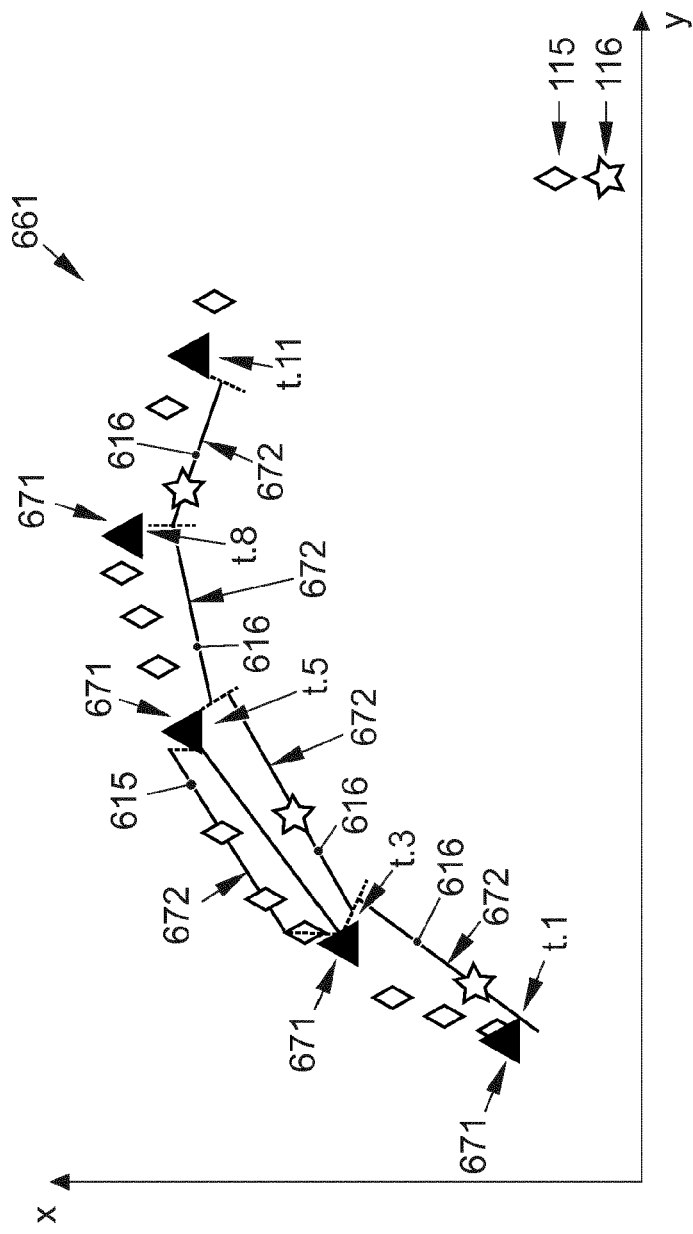
FIG. 7 schematically illustrates the generation of edges of the pose graph from FIG. 6 based on raw odometry position data according to various embodiments, wherein the raw odometry position data are received from an odometry positioning system at a specific sampling rate.

Odometry position data are ascertained in step 3, again with reference to FIG. 5. Corresponding aspects are illustrated with reference to FIG. 7. FIG. 7 shows the nodes 671 ascertained from the raw absolute position data 105, 106 that correspond to the absolute position data 605, 606 (wherein the corresponding boundary conditions are not illustrated in FIG. 7 for reasons of clarity).

Furthermore, FIG. 7 shows raw odometry position data 115 (the diamond symbol in FIG. 7) that are obtained with a comparatively high sampling rate; the sampling rate is greater than the clock rate. Because the raw odometry position data 115 are received at the particularly high sampling rate, they are interpolated to the clock rate. The raw odometry position data 115 are therefore converted by interpolation into odometry position data 615 data that correspond to the edges 672 of the pose graph 661. From the example in FIG. 7, it can be seen that the interpolation of the raw odometry position data 115 corresponds to a reduction of the time resolution of the odometry position data 615 ascertained thereby in comparison to the raw odometry position data 115 (the corresponding edges 672 are longer than the distances between temporally adjacent raw odometry position data 115). Consequently, adjacent nodes 671 of the pose graph 661 are each connected only by a corresponding edge 672 that corresponds to the odometry position data 615. This makes the chain geometry of the pose graph 661 possible.

In the example in FIG. 7, additional raw odometry position data 116 (the star symbol in FIG. 7) are also shown that are obtained at a comparatively low sampling rate; this sampling rate is slower than the clock rate. Because the raw odometry position data 116 are received at a particularly low sampling rate, they are interpolated to the clock rate. The raw odometry position data 116 are therefore also converted by interpolation into odometry position data 616 data that correspond to the edges 672 of the pose graph 661. From the example in FIG. 7, it can be seen that the interpolation of the raw odometry position data 116 corresponds to a reduction of the time resolution of the odometry position data 616 ascertained thereby in comparison to the raw odometry position data 116 (the corresponding edges 672 are shorter than the distances between chronologically adjacent raw odometry position data 116). However, consequently, the corresponding edges 672 of the pose graph 661 do not skip any nodes 671 of the pose graph 661. This makes a chain geometry of the pose graph 661 possible since branches are avoided.

Corresponding techniques that are disclosed above with regard to the rejection of raw absolute position data 105, 106 can also be applied to the raw odometry position data 115, 116.

Again with regard to FIG. 5, the pose graph 661, i.e., the nodes 671 and edges 672, is then generated in step 4 based on the position data 105, 106, 115, 116 generated in steps 2 and 3. For this, the nodes 671 to be optimized are inserted at fixed time intervals determined according to the given clock rate.

Figure 8:
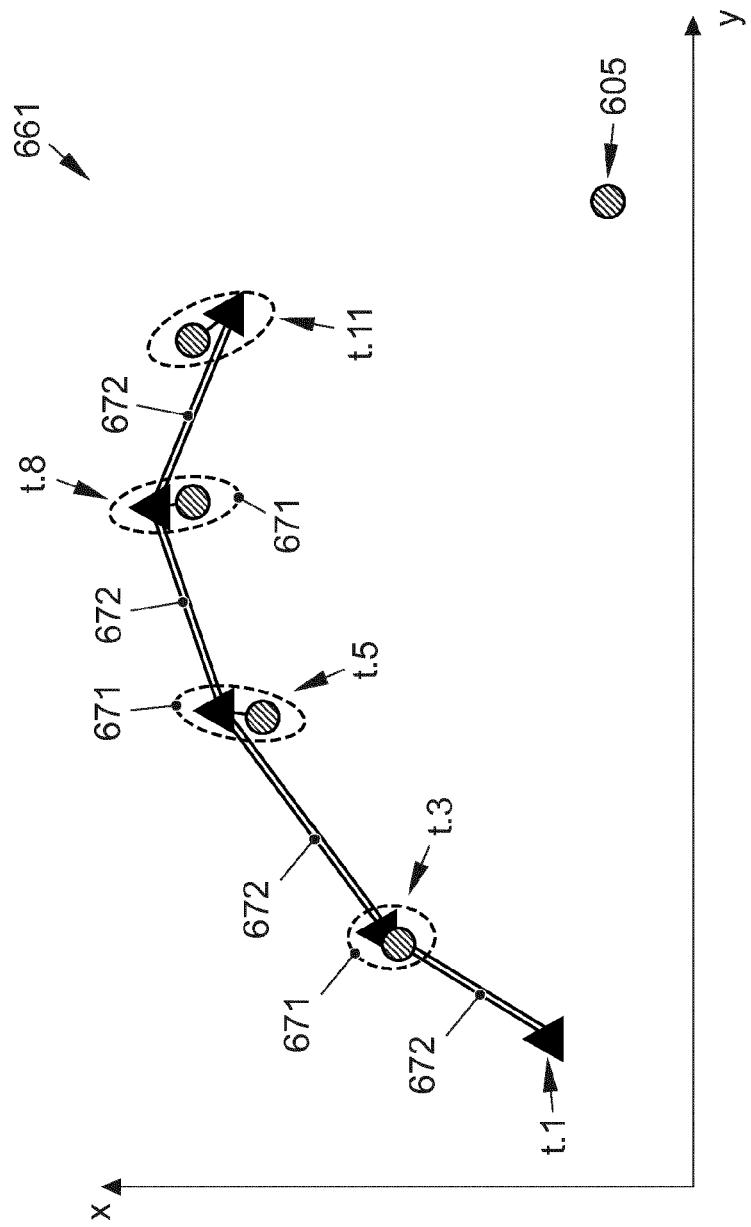
FIG. 8 schematically illustrates the pose graph from FIGS. 6 and 7 before the pose graph is optimized.

FIG. 8 shows the pose graph 661 to be optimized; in particular with regard to the nodes 671, the aspect of the boundary condition is graphically illustrated by the link between the schematically illustrated absolute position data 605 and the optimization node 671.

The pose graph 661 has a chain geometry in the example in FIG. 8. This means that no nodes 671 have more than two directly adjacent nodes. The directly adjacent nodes are, for example, defined with regard to links between the nodes 671 by one or more edges 672. In particular, no nodes 671 are connected to the respective directly adjacent nodes 671 by more than four edges. This is the case since two edges 672 are implemented between directly adjacent nodes 671 that correspond to both odometry position data 615, 616 (see FIG. 7). In general, it is possible for no nodes 671 to be connected to the respectively directly adjacent nodes 671 by more than $2 \cdot N$, wherein N describes the number of outputs from the odometry positioning systems 111, 112. In addition, no edge 672 links more than two nodes 671.

The pose graph 661 with edge geometry from FIG. 8 does not have any branches. Due to the chain geometry of pose graph 661, the corresponding system matrix has a block tridiagonal shape. This can enable a particularly computationally efficient optimization, which is why the optimization time can be particularly short.

The goal of optimization is to globally minimize a corresponding error function considering the boundary conditions. The edges 672 also form boundary conditions for the optimization of the nodes 671. The graph 661 is transmitted to the backend 153 for optimization.

Again with reference to FIG. 5: Finally, the pose graph 661 is optimized in step 5. It can then be assumed that the optimized pose graph 661 represents a best possible compromise consisting of the various position data 105, 106, 115, 116 from the positioning systems 101, 102, 111-113 to be fused.

Figure 9:
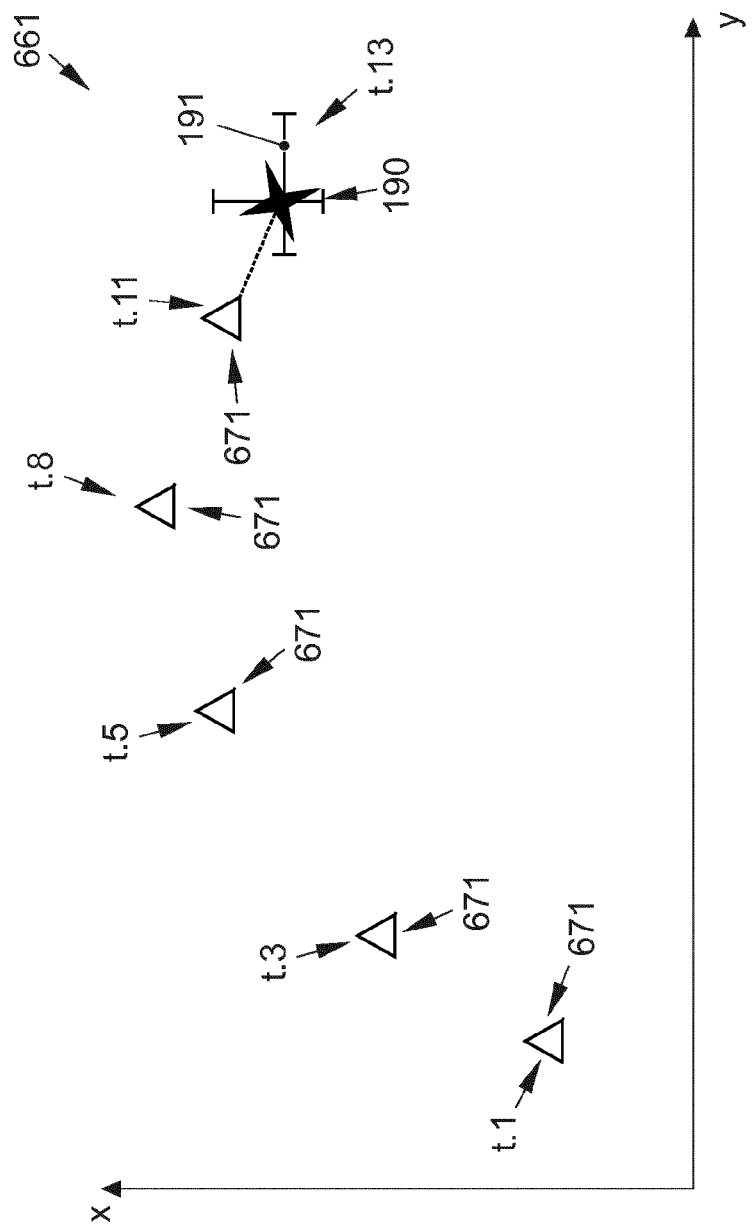
FIG. 9 schematically illustrates the optimized pose graph from FIGS. 6-8, and moreover illustrates an estimated position of a motor vehicle obtained from the optimized pose graph.

FIG. 9 shows aspects of the optimized pose graph 661. FIG. 9 shows the now-optimized nodes 671 as well as the estimated ACTUAL position 190 of the motor vehicle. It can be seen in FIG. 9 that the ACTUAL position 190 is predicted for the future point in time t.13 (illustrated in FIG. 9 by the dotted line). This allows a latency time to be compensated for the optimization of the pose graph 661. The prediction of the ACTUAL position 190 allows there to already be a current estimation of the position 190 at the beginning of the next iteration according to step 1 in FIG. 5.

An interpolation of the last two optimized nodes 671 can occur in various examples to predict the ACTUAL position 190. From this, an intrinsic movement of the motor vehicle can be determined and optionally output. Given the assumption that the motor vehicle will behave exactly in the near future as in the last known past, this intrinsic movement is appended to the most recent optimized node 671 by vector addition.

The ACTUAL position 190 is determined with a specific precision that is inversely proportional to a reliability 191 (illustrated in FIG. 9 by means of the error bar). The reliability 191 can also be considered for controlling the driver assistance functionality 129.

From the above, it can be seen that the optimization clock rate can be actively controlled. For example, it can be possible to monitor the time that is required per iteration to generate and optimize the pose graph 661, to determine the ACTUAL position, and to update the pose graph 661 by rejecting old raw position data 105, 106, 115, 116. The monitored time can be adapted by changing a wide range of parameters such as the number of optimization iterations and/or the number of nodes 671.

Figure 10:
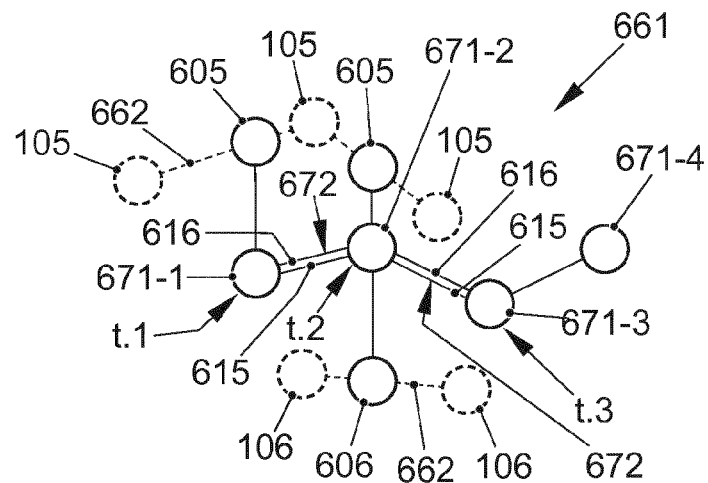
FIG. 10 schematically illustrates a pose graph with a chain geometry according to various embodiments.

FIG. 10 illustrates a pose graph 661 that can be determined by means of the above-described techniques. The pose graph 661 has a plurality of nodes 671-1-671-4 that are arranged at fixed time intervals relative to each other at points in time t.1, t.2 and t.3. The pose graph 661 has a chain geometry.

The various nodes 671-1-671-4 are each assigned absolute position data 605, 606; this assignment can be carried out in the form of boundary conditions (portrayed in FIG. 10 by the vertical lines). The absolute position data 605, 606 correspond to fixed nodes since their position does not change during the optimization of the pose graph 661. In the process, interpolation techniques can be used; raw absolute position data 105, 106 can be depicted on the absolute position data 605, 606 that are arranged at points in time t.1, t.2 and t.3 and correspond to the nodes 671-1-671-4 to be optimized. Finally, the edges 672 of the pose graph 661 can be generated, for example based on the odometry position data 615, 616.

Figure 11:
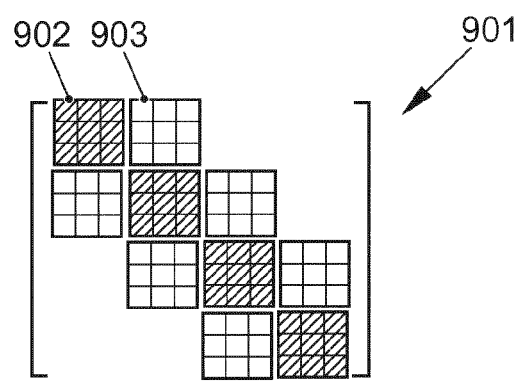
FIG. 11 schematically illustrates a system matrix for the pose graph from FIG. 10 according to various embodiments.

FIG. 11 illustrates aspects with regard to a system matrix 901 for the pose graph 661 from FIG. 10 with a chain geometry. The system matrix 901, H is the matrix that is inverted during the optimization, for example by means of a Gauss-Newton method or a Levenberg-Marquardt method. This can correspond to the solution of the following equation:

$$H\Delta x = -b \quad (1)$$

where $\Delta x$ describes the updating vector and b describes the coefficient vector. Typically, the solution to equation 1 is faster by inversion when the system matrix 901 is sparsely filled.

The system matrix 901 comprises diagonal entries 902 that are each influenced as boundary conditions by the absolute position data 605, 606 and the odometry position data 615, 616. The non-diagonal entries 903 are only influenced as boundary conditions by the odometry position data 615, 616.

In FIG. 11, it can be seen that the system matrix 901 does not have any entries that are particularly distant from the main diagonal. The entries in the system matrix 901 are all grouped around the main diagonal. Frequently such a scenario in which the various entries of the system matrix 901 are not distant from the main diagonal is described as a band matrix. A special shape of the band matrix is the block tridiagonal shape. The band can consist of blocks of approximately the size 3×3. The block tridiagonal geometry results from the chain geometry of the pose graph 661 (see FIG. 10). The block tridiagonal system matrix 901 can therefore be divided into different blocks as schematically shown in FIG. 11. The block tridiagonal system matrix 901 has blocks, for example, only in the two diagonals directly adjacent to the main diagonal. The block tridiagonal matrix can therefore correspond to a tridiagonal matrix that has block entries instead of individual entries on the first secondary diagonals above and below the main diagonal. Sometimes the block tridiagonal matrix is also designated a block tridiagonal.

If new nodes 671 are inserted whenever new absolute position data 605, 606 and/or new odometry position data 615 are available, a branched structure of the pose graph 661 results, and therefore also a branched structure of the system matrix 901. It is therefore desirable in various embodiments to perform a marginalization of the pose graph 661 from time to time. A fixed node can be used as a replacement for a chosen previous node. The fixed node can, for example, contain the same information as the Schur complement. At the same time, such a fixed node can have the advantage that said fixed node can be explicitly found again in the design of the pose graph 661 and therefore can be deliberately manipulated. The fixed node can have a position that deviates from the position of the deleted node.

Conventionally, the Schur complement is applied to equation 1 in order to remove state variables from the optimization problem. In the pose graph 661, this operation corresponds to the removal of the corresponding node 671. The Schur complement ensures that the remaining nodes 671 retain the same estimated value before and after the application. There would be a different estimated value if the state variables were simply deleted; this means that simply removing a node 671 would distort the estimation of the vehicle position. In a time window method, the state vector consists of m state variables.

From the above, it can be seen that the pose graph 661 can be marginalized by determining a fixed node. In one example, those nodes can be selected for the marginalization that correspond to the oldest point in time t.1. In other cases, however, another node 671 could be selected.

The marginalization of the pose graph can be supported by the chain geometry. This will be further explained below in conjunction with the example in FIGS. 10 and 11. If, for example, one wanted to marginalize the node 671-2 in the pose graph 661 in FIG. 10, this would lead to a linkage of the nodes 671-1 and 671-3.

If the oldest node, i.e., the node 671-1 in the example in FIG. 10, is marginalized, there would not be an additional link between the existing nodes 671-2-671-4 in the case of the pose graph 661 with the chain geometry. The chain structure is thereby retained. In the case of a pose graph without a chain structure, the node 671-1 could also, for example, be connected to the node 671-4 by an edge (not shown in FIG. 10). In such a case, the marginalization of the node 671-1 would lead to a linkage of the node 671-2 with node 671-4. From this it can be seen that the graph 661 becomes filled more and more densely with repeated marginalization and arbitrarily arranged edges 672 of the pose graph 661. From this, a structure of the system matrix 901 results that is no longer sparsely filled. This typically extends the optimization time.

Figure 12:
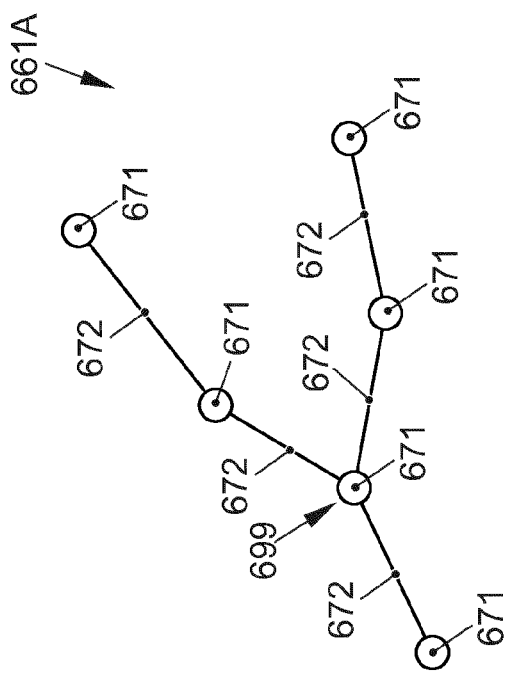

FIG. 12 illustrates aspects with respect to a pose graph 661A that does not have a chain structure. In particular, the pose graph 661A has a branch 699. The branch 699 connects three arms of the pose graph 661A to each other. A pose graph 661A with a chain geometry typically does not have any branches 699.

Figure 13:
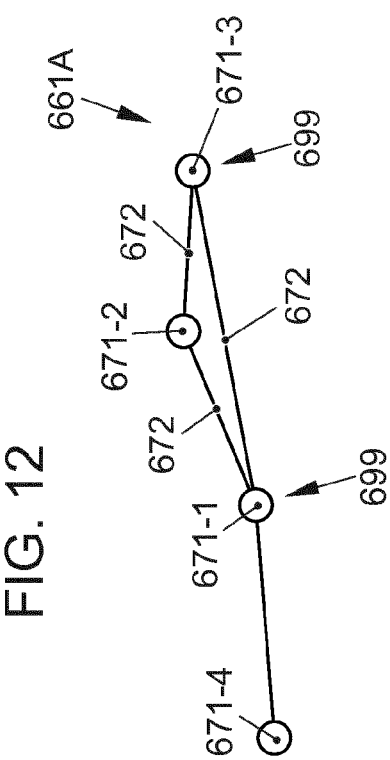

FIG. 13 illustrates aspects with respect to a pose graph 661A that does not have a chain structure. In the example in FIG. 13, the node 671-1 has three direct neighbors, i.e., the nodes 671-2, 671-3 and 671-4. Such a situation can, for example, arise when raw odometry position data are obtained at a comparatively slow sampling rate, and a suitable interpolation has not been performed to ascertain the corresponding odometry position data that correspond to the edge 672 between the nodes 671-1, 671-3. A pose graph with a chain geometry typically does not have any nodes that have more than two direct neighbors.

Figure 14:
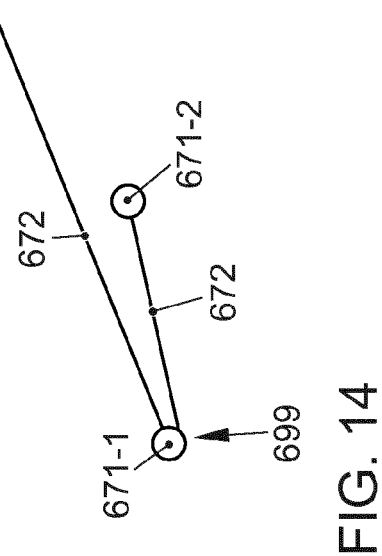
FIGS. 12, 13, and 14 schematically illustrate a pose graph without a chain geometry.

FIG. 14 illustrates aspects with respect to a pose graph 661A that does not have a chain structure. In the example in FIG. 14, an edge 672 is connected to more than two nodes 671-1, 671-2, 671-3. A pose graph with a chain geometry typically does not have any edges that are connected to more than two nodes.

In summary, various construction conditions were described above for edges in a pose graph that correspond to odometry position data. These construction conditions result in a chain geometry of the pose graph. Due to the chain geometry of the pose graph, the optimization time can be shortened so that shorter runtimes can be obtained for corresponding techniques for positioning a mobile machine. Moreover, these techniques make it possible to apply established optimization algorithms such as a Cholesky decomposition.

In summary, at least the following examples were described above:

Example 1

A method that comprises:
for each of a plurality of points in time (t.1-1.12): ascertaining in each case odometry position data (615) of a motor vehicle based on an output from at least one odometry positioning system (111, 112),
for each of the plurality of points in time (t.1-1.12): ascertaining in each case absolute position data (605, 606) of the motor vehicle based on an output from at least one absolute positioning system (101, 102),
generating (152) a pose graph (661), wherein edges (672) of the pose graph (661) correspond to the odometry position data (615), wherein nodes (671) of the pose graph (661) correspond to the absolute position data (605, 606),
optimizing (153) the pose graph (661) to obtain an estimated position (190) of the motor vehicle,
controlling a driver assistance functionality (129) based on the estimated position (190) of the motor vehicle.

Example 2

The method according to example 1,
wherein the estimated position (190) of the motor vehicle at a future point in time (t.13) relative to the plurality of points in time (t.1-1.12) is obtained by optimizing (153) the pose graph (661), Example 3

The method according to example 1 or 2, wherein the method moreover comprises:
determining the plurality of points in time (t.1-1.12) based on a given clock rate,
in each case with associated sampling rates (202): receiving raw odometry position data (115, 116) as the output from the at least one odometry positioning system (111, 112),
in each case with associated sampling rates (202): receiving raw absolute position data (105, 106) as the output from the at least one absolute positioning system (101, 102),
wherein the given clock rate is different from the sampling rate (202).

Example 4

The method according to one of the preceding examples, wherein an iteration of the generation (152) and optimization (153) of the pose graph (661) is performed for each cycle of a given optimization clock rate, and wherein the corresponding estimated position (190) of the motor vehicle is obtained for each iteration.

Example 5

The method according to examples 3 and 4 which moreover comprises:
monitoring a time that is required at least for the optimization (153) of the pose graph (661) in the various iterations,
determining the given clock rate and/or a number of the plurality of points in time (t.1-1.12) and/or a precision of the optimization (153) depending on the monitoring of the time.

Example 6

The method according to example 3 or 5,
wherein the given clock rate lies within a range of 1 Hz-1,000 Hz, preferably within a range of 10 Hz-100 Hz, particularly preferably within a range of 25 Hz-50 Hz; and/or wherein at least one of the sampling rates (202) lies within a range of 0.1 Hz-100 Hz, preferably within a range of 0.5 Hz-10 Hz, particularly preferably within a range of 0.5 Hz-2 Hz.

Example 7

The method according to one of examples 3, 5 or 6,
wherein at least one of the sampling rates (202) comprises interruptions (203) of more than two sampling intervals, preferably more than 10 sampling intervals, particularly preferably more than 100 sampling intervals.

Example 8

The method according to one of the preceding examples,
wherein the absolute position data (605, 606) are ascertained based on the output from a first absolute positioning system (101, 102) in each case for the plurality of points in time (t.1-t.12) in a first time interval (201),
wherein the absolute position data (605, 606) are ascertained based on the output from a second absolute positioning system (101, 102) in each case for the plurality of points in time (t.1-t.12) in a second time interval (201),
wherein the absolute position data (605, 606) are ascertained for the plurality of points in time (t.1-t.12) in the first time interval (201) not based on the output from the second absolute positioning system (101, 102).

Example 9

The method according to one of the preceding examples,
receiving raw odometry position data (115, 116) as the output from the at least one odometry positioning system (111, 112),
receiving raw absolute position data (105, 106) as the output from the at least one absolute positioning system (101, 102),
selective rejection of parts of the raw absolute position data (105, 106) and parts of the raw odometry position data (115, 116) before generating the pose graph (661).

Example 10

The method according to example 9,
wherein the selective rejection is based on a time difference between the ACTUAL time and a timestamp of the respective raw absolute position data (105, 106) and the raw absolute odometry data.

Example 11

The method according to example 9 or 10, and according to one of examples 3, 5, 6 or 7,
wherein the selective rejection of parts of the raw absolute position data (105, 106) is based on a data density of the raw absolute position data (105, 106) within the time period, and on the clock rate.

Example 12

The method according to one of examples 9-11 and according to example 4 or 5,
wherein the selected rejection is based on the given optimization clock rate.

Example 13

The method according to one of the preceding examples,
wherein by optimizing (153) the pose graph (661), a reliability (191) of the estimated position (190) of the motor vehicle is also obtained,
wherein the driver assistance functionality (129) of the motor vehicle is also controlled based on the reliability (191) of the estimated position (190).

Example 14

A control unit (120) comprising:
at least one interface (121, 122) that is configured to receive in each case output from at least one odometry positioning system (111, 112), and to receive in each case output from at least one absolute positioning system (101, 102),
at least one processor (123) that is configured to ascertain odometry position data (615) on a motor vehicle based on the output from the at least one odometry positioning system (111, 112) for each of a plurality of points in time (t.1-1.12),
wherein the at least one processor (123) is moreover configured to ascertain absolute position data (605, 606) of a motor vehicle based on the output from the at least one absolute positioning system (101, 102) for each of a plurality of points in time (t.1-1.12),
wherein the at least one processor (12nt3) is moreover configured to generate a pose graph (661),
wherein edges (672) of the pose graph (661) correspond to the odometry position data (615),
wherein nodes (671) of the pose graph (661) correspond to the absolute position data (605, 606),
wherein the at least one processor (123) is moreover configured to optimize (153) the pose graph (661) to obtain an estimated position (190) of the motor vehicle,
wherein the at least one processor (123) is moreover configured to control a driver assistance functionality (129) based on the estimated position (190) of the motor vehicle.

Example 15

The control unit (120) according to example 14,
wherein the control unit (120) is configured to perform a method according to one of examples 1-13.

Of course, the features of the above-described embodiments and aspects of the invention can be combined with each other. In particular, the features can be used not just in the described combinations but also in other combinations or per se without departing from the scope of the invention.

For example, various aspects were described in the preceding with reference to the optimization in conjunction with the Cholesky decomposition. In general, however, other optimization algorithms can also be used to perform the optimization such as a Gauss-Newton method.

For example, a wide range of examples was described in the preceding with reference to obtaining the estimated position from the optimization of the pose graph. Alternatively or in addition, it can be possible to obtain an estimated orientation, or respectively odometry of the motor vehicle from the optimization of the pose graph and, for example, consider it in the context of controlling the driver assistance functionality.

For example, a wide range of examples were described in the preceding with reference to controlling a driver assistance functionality for anonymous driving. Alternatively or in addition, other driver assistance functionalities can also be controlled such as partial or highly automated driving solutions, etc.

In the preceding, various examples were described with reference to determining an estimated position from the optimization of the pose graph. Such techniques that relate to a pose graph with a chain structure can, however, also be applied to other graph-based problems. Examples comprise, for example, calibration problems and SLAM problems.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit may fulfill the functions of several items recited in the claims.

The mere fact that certain measures are recited in mutually different dependent claims or embodiments does not indicate that a combination of these measured cannot be used to advantage. Any reference signs in the claims and elsewhere should not be construed as limiting the scope.

REFERENCE SIGN LIST t.1-t.13 Point in time
1-5 Step
101 Absolute positioning system
102 Absolute positioning system
111 Odometry positioning system
112 Odometry positioning system
113 Odometry positioning system
121 Interface
122 Interface
123 Processor
124 Memory
129 Driver assistance
151 Positioning fusion
152 Graph administration
153 Backend, optimization
190 Actual position
191 Reliability
201 Time interval
202 Sampling rate
203 Interruption
105, 106 Raw absolute position data
115, 116 Raw odometry position data
615 Odometry position data
661, 661A Pose graph
662 Interpolation
671, 671-1-671-4 Nodes
672 Edges
605, 606 Absolute position data
901 System matrix
902, 903 Entries in the system matrix

The invention claimed is:

1. A method for controlling a driver assistance system of a vehicle, comprising:
for each of a plurality of points in time: ascertaining in each case odometry position data of the vehicle based on an output from at least one odometry positioning system;
for each of the plurality of points in time: ascertaining in each case absolute position data of the vehicle based on an output from at least a GPS receiver;
generating a pose graph, wherein edges of the pose graph correspond to the odometry position data, nodes of the pose graph correspond to the absolute position data; and
the pose graph has a chain geometry wherein no nodes of the pose graph have more than two directly adjacent nodes;
optimizing the pose graph to obtain an estimated position of the vehicle; and
controlling a driver assistance system of the vehicle based on the estimated position of the vehicle.

2. The method of claim 1, wherein the at least one odometry positioning system comprises at least a vehicle chassis odometry system.

3. The method of claim 1, wherein the method moreover comprises:
receiving raw odometry position data as the at least one output from the at least one odometry positioning system;
receiving raw absolute position data as the at least one output from the at least one absolute positioning system;
interpolating the raw absolute position data based on a given clock rate to ascertain the absolute position data; and
interpolating the raw odometry position data based on the given clock rate to ascertain the odometry position data.

4. The method of claim 3, wherein the interpolation of the raw odometry position data corresponds to a reduction of the time resolution of at least some of the odometry position data ascertained thereby in comparison to the corresponding raw odometry position data.

5. The method of claim 1, wherein
the absolute position data are ascertained based on the output from a first absolute positioning system for the plurality of points in time in a first time interval; wherein
the absolute position data are ascertained based on the output from a second absolute positioning system for the plurality of points in time in a second time interval; and wherein
the absolute position data are ascertained for the plurality of points in time in the first time interval not based on the output from the second absolute positioning system.

6. The method of claim 1, further comprising
receiving raw odometry position data as the output from the at least one odometry positioning system;
receiving raw absolute position data as the output from the at least one absolute positioning system;
selective rejection of parts of the raw absolute position data and parts of the raw odometry position data before generating the pose graph; wherein
the selective rejection is optionally based on a time difference between the ACTUAL time and a timestamp of the respective raw absolute position data and the raw absolute odometry data.

7. The method of claim 1, wherein a system matrix describing the pose graph has a block tridiagonal shape.

8. A control unit for a vehicle, comprising at least:
a first interface that is configured to
a) receive output from at least one odometry positioning system of the vehicle, and to
b) receive output from at least a GPS receiver of the vehicle;
a second interface for connecting to a driver assistance system of the vehicle; and a processor that is configured to ascertain odometry position data of the vehicle based on the output from the at least one odometry positioning system of the vehicle for each of a plurality of points in time; and to ascertain absolute position data of the vehicle based on the output from the at least one absolute positioning system of the vehicle for each of the plurality of points in time; wherein the at least one processor is further configured to generate a pose graph; wherein edges of the pose graph correspond to the odometry position data, nodes of the pose graph correspond to the absolute position data, and the pose graph has a chain geometry wherein no nodes of the pose graph have more than two directly adjacent nodes; wherein the at least one processor is further configured to optimize the pose graph to obtain an estimated position of the vehicle; and wherein the processor is configured to control the driver assistance system via the second interface using the estimated position of the vehicle.

9. The control unit of claim 8, wherein the control unit is configured to perform a method according to claim 1.

10. The control unit of claim 8, wherein the at least one odometry positioning system comprises at least a vehicle chassis odometry system.

11. The method of claim 2, wherein the pose graph has a chain geometry.

12. The method of claim 2, wherein the method moreover comprises:
receiving raw odometry position data as the at least one output from the at least one odometry positioning system;
receiving raw absolute position data as the at least one output from the at least one absolute positioning system;
interpolating the raw absolute position data based on a given clock rate to ascertain the absolute position data; and
interpolating the raw odometry position data based on the given clock rate to ascertain the odometry position data.

13. The method of claim 1, wherein the method moreover comprises: receiving raw odometry position data as the at least one output from the at least one odometry positioning system; receiving raw absolute position data as the at least one output from the at least one absolute positioning system; interpolating the raw absolute position data based on a given clock rate to ascertain the absolute position data; and interpolating the raw odometry position data based on the given clock rate to ascertain the odometry position data.

14. The method of claim 1, wherein a system matrix describing the pose graph has a block tridiagonal shape.

15. A non-transitory machine-readable medium comprising contents to cause a control unit to conduct the method of claim 1.

16. The method of claim 1, wherein controlling the driver assistance system of the vehicle is conducted substantially in real time.

17. A method for controlling a driver assistance system of a vehicle, comprising:
for each of a plurality of points in time: ascertaining in each case odometry position data of the vehicle based on an output from at least a vehicle chassis odometry system;
for each of the plurality of points in time: ascertaining in each case absolute position data of the vehicle based on an output from at least one absolute positioning system;
generating a pose graph, wherein edges of the pose graph correspond to the odometry position data, nodes of the pose graph correspond to the absolute position data, and the pose graph has a chain geometry wherein no nodes of the pose graph have more than two directly adjacent nodes;
optimizing the pose graph to obtain an estimated position of the vehicle; and
controlling a driver assistance system of the vehicle based on the estimated position of the vehicle.

18. The method of claim 17, wherein the at least one absolute positioning system comprises at least a GPS receiver.

19. The method of claim 17, wherein controlling the driver assistance system of the vehicle is conducted substantially in real time.

\* \* \* \* \*